United States Patent [19]
Babaian et al.

[11] Patent Number: 5,958,048
[45] Date of Patent: Sep. 28, 1999

[54] ARCHITECTURAL SUPPORT FOR SOFTWARE PIPELINING OF NESTED LOOPS

[75] Inventors: Boris A. Babaian; Feodor A. Gruzdov; Yuli Kh. Sakhin; Vladimir S. Volin; Vladimir Yu. Volkonski, all of Moscow, Russian Federation

[73] Assignee: Elbrus International Ltd., Grand Cayman, Cayman Islands

[21] Appl. No.: 08/733,479

[22] Filed: Oct. 18, 1996

Related U.S. Application Data

[63] Continuation of application No. PCT/RU96/00216, Aug. 7, 1996.

[51] Int. Cl.$^6$ .............................. G06F 9/40; G06F 9/44; G06F 9/38
[52] U.S. Cl. ........................... 712/241; 713/502; 712/32
[58] Field of Search .................................. 395/595, 387, 395/588, 567, 3 R, 800.35, 557; 360/78.04, 77.06, 78.09; 364/DIG. 1, DIG. 2, 685, 716.09, 768; 711/130

[56] References Cited

U.S. PATENT DOCUMENTS

| | | | |
|---|---|---|---|
| 4,236,227 | 11/1980 | Bull et al. | 365/49 |
| 4,652,997 | 3/1987 | Kloker | 395/588 |
| 4,984,151 | 1/1991 | Dujari | 395/588 |
| 5,036,454 | 7/1991 | Rau et al. | 364/200 |
| 5,081,575 | 1/1992 | Hill et al. | 385/312 |
| 5,083,267 | 1/1992 | Rau et al. | |
| 5,210,827 | 5/1993 | Takahasi | 395/200 |
| 5,226,128 | 7/1993 | Rau et al. | 395/375 |
| 5,471,189 | 11/1995 | Dietz et al. | 340/146.2 |
| 5,530,665 | 6/1996 | Yoneda | 365/49 |

FOREIGN PATENT DOCUMENTS

| | | |
|---|---|---|
| 0293851 | 12/1980 | European Pat. Off. . |
| 741269 | 6/1980 | Russian Federation . |
| 742942 | 6/1980 | Russian Federation . |

OTHER PUBLICATIONS

Linley Gwennap, VLIW: The Wave of the Future? Processor Design Style Could Be Faster, Cheaper Than RISC, Feb. 14, 1994, pp. 18–21.

Vinod Kathail, Michael Schlansker, and B. Ramakrishna Rau, HPL PlayDoh Architecture Specification: Version 1.0, Feb. 1994, pp. 1–48.

Gary R. Beck and David W.L. Yen, *The Cydra 5 Minisupercomputer*: Architecture and Implementation, 1993, pp. 143–180.

James C. Dehnert and Ross A. Towle, Compiling for the Cydra 5, 1993, 181–227.

James C. Dehnert, Peter Y.–T. Hsu, and Joseph P. Bratt, Overlapped Loop Support in the Cydra 5, 1989, pp. 26–38.

*Primary Examiner*—Daniel H. Pan
*Attorney, Agent, or Firm*—Pennie & Edmonds LLP

[57] ABSTRACT

For certain classes of software pipelined loops, prologue and epilogue portions of adjacent inner loops in a nested loop can be overlapped. In this way, outer loop code, as well as inner loop code, can be software pipelined. Architectural support for software pipelined nested loops is provided by a set of loop parameter and status registers and by an implementation of loop state dependent, multiway control transfers. For loop body code compatible with two simple constraints, the present invention does not require additional code elements for disabling garbage operations during prologue and epilogue loop periods of adjacent inner loops. Nested loop control allows overlap between the epilogue period of a prior inner loop and the prologue period of a next inner loop. As a result, nested loop code can be more efficiently scheduled by a compiler for execution on a processor such as VLIW processor which provides architectural support for software pipelined nested loops, thereby providing improved loop performance. Loop state dependent, multiway control transfers are provided by multi-way control transfer logic which includes the loop parameter and status registers and a branch target selector for selecting control transfer addresses corresponding to inner loop body code, a start patch, and a finish patch from control transfer address registers in accordance with loop state.

24 Claims, 10 Drawing Sheets

ARCHITECTURAL SUPPORT FOR SOFTWARE PIPELINING OF NESTED LOOPS

The present application is a continuation of and claims priority under 35 U.S.C. §120 of the co-pending PCT international application designating the United States of America (serial no. PCT/RU96/00216) filed Aug. 7, 1996, naming Babaian et al. as inventors and entitled "ARCHITECTURAL SUPPORT FOR SOFTWARE PIPELINING OF NESTED LOOPS".

RELATED APPLICATIONS

The present invention is related to subject matter disclosed in the following co-pending U.S. patent application Ser. No.: 08/733,480 ("Architectural Support for Execution Control of Prologue and Epilogue Periods of Loops in a VLIW Processor"); Ser. No. 08/733,832 ("Wide Instruction Unpack"); Ser. No. 08/33,834 ("Multifunctional Execution Unit, Executing Combined Operations and Supporting Continuing Instruction Flow"); and Ser. No. 08/733,831 ("Array Prefetch Algorithm"); each filed on even date herewith and each incorporated herein by reference, in its entirety.

BACKGROUND OF THE INVENTION

1. Field of the Invention

The present invention relates to processor architectures, and more particularly to processor architectures amenable to software pipelining techniques.

2. Description of the Related Art

Very Long Instruction Word (VLIW) processor architectures represent a design approach for exploiting instruction level parallelism in which the bulk of instruction scheduling and parallel dispatch is relegated to a compiler. In some ways, VLIW is a natural successor to RISC, furthering a trend toward moving complexity from the hardware to a compiler so as to enable simpler, faster processors. See Gwennap, VLIW: The Wave of the Future, *Microprocessor Report*, Feb. 14, 1994, pp. 18–21 (discussing VLIW architectures). A VLIW processor design eliminates the need for complex instruction scheduling logic on the chip by shifting scheduling responsibilities to the compiler. Parallelism is determined explicitly by a compiler at a program code level. The compiler generates code which is suitable for parallel execution at multiple execution units and which allows for data and resource dependencies. When data dependencies are dynamic, they are explicitly mapped in the compiled code.

Such compiled code is organized as VLIW instructions encoding a number of independent operations that can be executed by execution units of the VLIW processor, in parallel. A typical VLIW instruction horizontally encodes multiple operations as a single, very long instruction; hence the name. These operations can flow directly to associated functional units with a minimum of decoding. NOPs are provided to functional units and a pure VLIW processor has no hardware scheduling interlocks, relying instead on the compiler for scheduling and dependency handling.

The Cydra 5 was an early VLIW implementation. See generally, Beck et al., The Cydra 5 Minisupercomputer: Architecture and Implementation, *Journal of Supercomputing*, 7, 143–180 (1993) (providing a retrospective on the Cydra 5 architecture). The Cydra 5 was capable of initiating one instruction every clock cycle at each of six functional units. The Cydra 5 supported two instruction formats: MultiOp and UniOp, as shown in FIG. 1. A MultiOp instruction, e.g., MultiOp instruction 110, included seven "containers," one for each of six functional units (e.g., containers 111, 112, 113, 114, 115, and 116) and a seventh (e.g., container 117) for instruction sequencing control. Each of the containers (shown collectively as containers 150) provided storage for an operation encoded in a format similar to that of a conventional load-store RISC instruction. However, in addition, containers 111, 112, 113, 114, 115, and 116 included respective predicate specifiers 121, 122, 123, 124, 125, and 126.

The effectiveness of the MultiOp format was highly dependent on the program, and on how effectively the compiler could extract operations for parallel execution. In particular, performance and capacity of the instruction cache was adversely affected if there was little inherent parallelism to encode, i.e., if the containers of a MultiOp instruction encoded mainly null operations (or NOOPS). The UniOp format, as exemplified by UniOp instruction 180, was provided for such cases and included six containers 181, 182, 183, 184, 185, and 186 for encoding operations (six per UniOp instruction). During each cycle, a single operation from a UniOp instruction was decoded and supplied to a single one of the seven units (i.e., to one of six functional units or to the instruction unit) and NOOPs were supplied to the remaining six units. Successive operations of the UniOp instruction were decoded and supplied during successive cycles. Functional units of the Cydra 5 had the same behavior whether an operation was supplied from a MultiOp instruction or from a UniOp instruction, although, in the case of an operation supplied from a UniOp instruction, the associated. (unencoded) predicate was forced to true. A given instruction stream included of arbitrary mixes of MultiOp and UniOp instructions.

A major objective of the Cydra 5 architecture was to allow the overlapping of loop iterations without requiring multiple copies of the loop body or complex compensation code. See generally, Dehert et al., Overlapped Loop Support in the Cydra 5, *Proc. 2nd Internat. Conf. on Architectural Support for Programming Languages and Operating Systems* (Boston, Mass., Apr. 3–6, 1989), pp. 26–38. The approach taken by the Cydra 5 was to execute a compiled, overlapped loop schedule of TL cycles, organized as Stage Count (SC) stages where:

$$SC=TL/II$$

and where II is an iteration interval. As the execution of the loop progressed, during the first II cycles, the first stage of iteration 1 executed. During the next II cycles, the first stage of iteration 2 and the second stage of iteration 1 executed, and so on until SC different iterations were executing in different stages. In Cydra 5 terminology, the first SC-1 iterations of a loop, i.e., when not all stages were yet executing, was collectively known as the prologue. During the final SC iterations, the opposite process occurred until the last stage of the last iteration was executed. In Cydra 5 terminology, the final SC-1 iterations of a loop, i.e., when all stages were again not executing, was collectively known as the epilogue. The remaining iterations, i.e., when all stages were executing concurrently, were known as the kernel.

The loop scheduling model described above presented the Cydra 5 with several significant implementation issues, including the following:

1. To have all stages of a loop executing in parallel, while representing the entire loop schedule as a single folded schedule of II cycles, a mechanism for controlling the execution of initial and final iterations when not all stages were executing (i.e., during the prologue and epilogue) was necessary; and 2. Since an iteration of the loop schedule includes disjoint portions from SC different stages, conditional branches around code to be skipped were inadequate and an alternate mechanism for handing of conditional code in loop bodies was necessary.

The Cydra 5 provided a single mechanism to deal with prologue and epilogue control and with conditional code in loop bodies. The mechanism was based on a file of single-bit Iteration Control Registers (ICRs). In addition, the Cydra 5 mechanism relied on a loop counter (LC) register, which kept track of the number of prologue and kernel iterations yet to be executed, an epilogue stage counter (ESC), and a BRanch to TOP of loop (brtop) operation which specified the first instruction of the loop body as its branch target address.

To exploit the Cydra 5 mechanism for prologue and epilogue control, ICR0 was set before loop entry and all other ICRs were cleared. On each successive iteration, an Iteration Control Pointer (ICP) into the ICR file was decremented, effectively shifting the ICR file. The brtop operation set a new logical ICR0 until LC reached zero. Thereafter, the logical ICR0 was cleared during each iteration until the ESC reached zero, indicating the end of the loop body. The compiler made first stage operations conditional on ICR0, second stage operations conditional on ICR1, etc. In this way, only first stage operations executed during the first iteration through the loop, only the first two stages executed during the second iteration, etc. At the end of the kernel, i.e., when LC reached zero, ICR0 was set to zero and first stage operations no longer executed. On each successive iteration, one less stage executed until the ESC reached zero and the loop was complete.

A number of elements of the ICR file equal to the stage count (SC) were used to provide prologue/epilogue control. Conditional code (including conditional code in the loop body) was handled similarly, using additional elements of the ICR file. See supra, Dehert et al., Overlapped Loop Support in the Cydra 5, for a more detailed description of Cydra 5 loop control, conditional execution, and brtop operation semantics.

SUMMARY OF THE INVENTION

It has been discovered that for certain classes of loops, prologue and epilogue portions of adjacent inner loops in a nested loop can be overlapped. In this way, outer loops, as well as inner loops, can be software pipelined. Architectural support for software pipelined nested loops is provided by a set of loop control registers and by an implementation of loop state dependent, multiway control transfers. For loop body code compatible with two simple constraints, the present invention advantageously requires no additional code elements for disabling garbage operations during prologue and epilogue loop periods of adjacent inner loops. Loop control in accordance with the present invention allows overlap between the epilogue period of a prior inner loop and the prologue period of a next inner loop. As a result, nested loop code can be more efficiently scheduled by a compiler for execution on a processor which provides architectural support for software pipelined nested loops in accordance with the present invention, thereby providing improved loop performance.

In one embodiment of the present invention, an apparatus includes first and second register complexes and multiway control transfer logic. The first register complex is responsive to physical iterations of inner loop body code and the state of the first register complex advances toward a beginning of last iteration state in correspondence with the physical iterations of the inner loop body code. The second register complex is responsive to physical iterations of inner loop body code and the state of the second register complex advances toward an end of last iteration state in correspondence with the physical iterations of the inner loop body code. The multiway control transfer logic is coupled to the first and second register complexes and is selective for a control transfer address, wherein the multiway control transfer logic selects a first control transfer address in response to an asserted beginning of last iteration state and selects a second control transfer address in response to an asserted end of last iteration state.

In another embodiment of the present invention, a method of controlling execution of software pipelined inner loop body code includes the steps of initializing a first register complex with an indication corresponding to a number of logical iterations in the inner loop body code; initializing a second register complex with an indication corresponding to a number of overlapped logical iterations minus one (NOVL−1) in the inner loop body code; advancing the state of the first register complex toward a beginning of last iteration state in correspondence with physical iterations of the inner loop body code; and advancing the state of the second register complex toward an end of last iteration state in correspondence with physical iterations of the inner loop body code. The method further includes the steps of when the first register complex reaches the beginning of last iteration state, transferring control, during a next physical iteration thereafter, to a start patch; and when the second register complex reaches the end of last iteration state, transferring control, during a next physical iteration thereafter, to a finish patch.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION OF THE PREFERRED EMBODIMENTS

Predicated execution of operations, such as that used in the Cydra 5 processor architecture, addresses the problem of partial code execution during prologue and epilogue periods in the execution of software-pipelined, inner loops. However, the Cydra 5 approach addresses only simple inner loops. For code with nested loops compiled for execution on the Cydra 5, only the inner loop body is software-pipelined. Overlapped execution is therefore limited to the logical iterations of an innermost loop. In contrast, a processor in accordance with the present invention provides, for certain classes of loops, loop control for software pipelined outer loops as well as inner loops. Loop control in accordance with the present invention provides overlapped execution of respective epilogue and prologue periods of adjacent inner loops.

Figure 1:
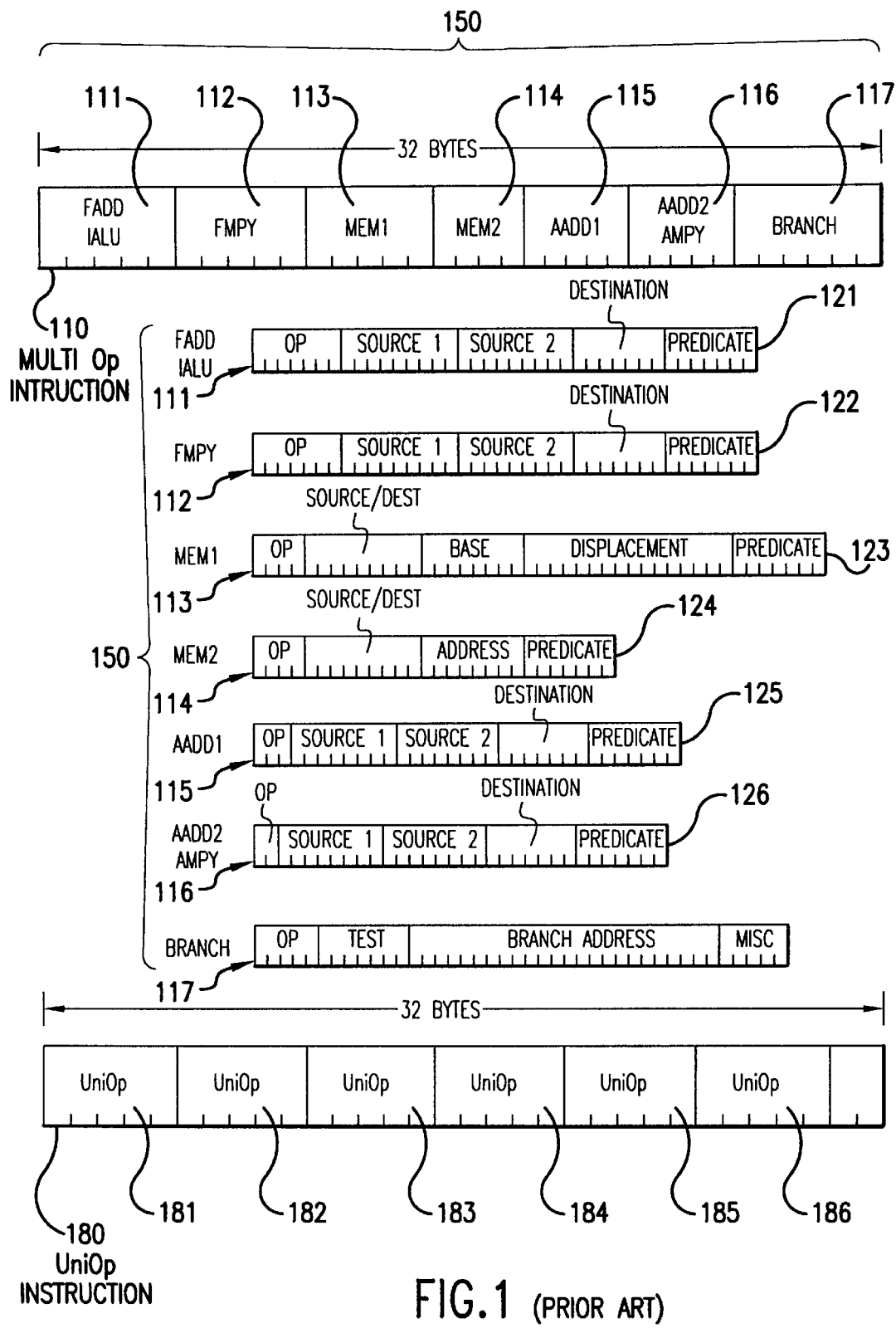
FIG. 1 is a pictorial illustration of the VLIW instruction format of the Cydra 5 processor architecture.
Figure 2:
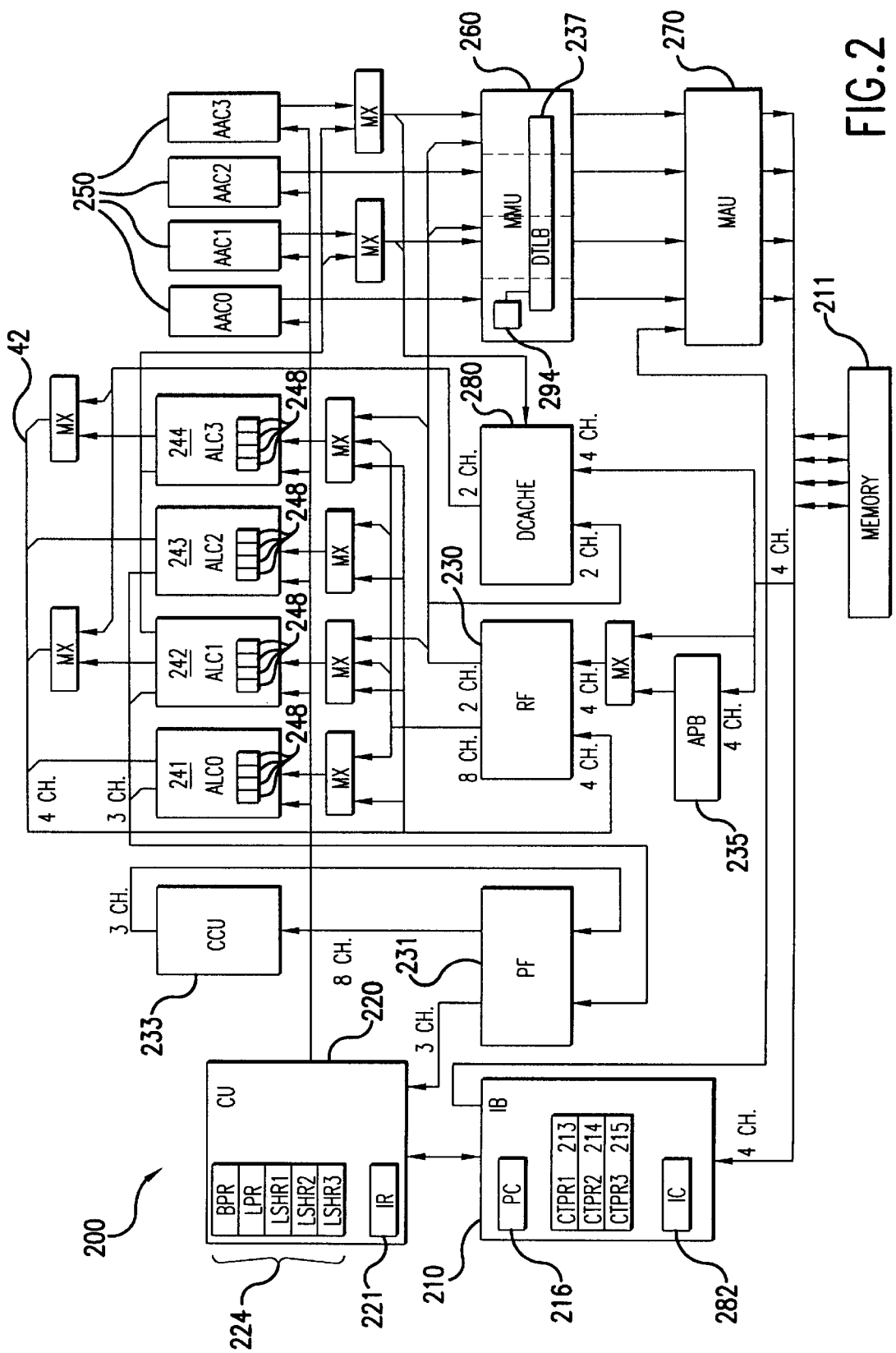
FIG. 2 is a system block diagram for a VLIW processor constructed in accordance with the teachings of the present invention.

FIG. 2 depicts the architecture of a Very Long Instruction Word (VLIW) processor 200 in accordance with an exemplary VLIW embodiment of the present invention. VLIW processor 200 includes an instruction buffer (IB) 210, a control unit (CU) 220, a multiport register file (RF) 230, 4 arithmetic logic channels (ALC0 241, ALC1 242, ALC2 243, and ALC3 244), each of which includes multiple execution units (EUs) 248, array access channels (AAC0, AAC1, AAC2, and AAC3) 250, a memory management unit (MMU) 260, a memory access unit (MAU) 270, an array prefetch buffer (APB) 235, and a data cache (DCACHE) 280.

VLIW processor 200 has a long instruction word architecture and exploits Instruction Level Parallelism (ILP) among operations of a long instruction word. A compiler is used to schedule operations to be executed by VLIW processor 200 during each cycle. The design of VLIW processor 200 allows concurrent execution of multiple independent operations (e.g., load, store, add, multiply, divide, shift, logical, and branch operations) that make up a long instruction. Long instructions are stored in a memory 211 and an instruction cache (IC) 282 of VLIW processor 200 in packed form.

Instruction buffer 210 fetches long instructions from memory 211, or from an included instruction cache (IC) 282 if cached. In an exemplary embodiment, instruction buffer 210 includes instruction cache (IC) 282, instruction alignment logic, a program counter register (PC) 216, and control transfer preparation registers (CTPR1 213, CTPR2 214, and CTPR3 215). Instruction cache (IC) 282 is filled in response to both linear program path pre-fetches and control transfer preparation operations.

Control Unit (CU) 220 issues wide instruction operations for execution and performs several tasks including:

1. reading operands from the register file (RF) 230 for provision to arithmetic logic channels (ALC0 241, ALC1 242, ALC2 243, and ALC3 244);

2. reading predicate values from predicate file (PF) 231 as condition codes for Control Transfer OPerations (CTOPs);

3. reading predicate values from the predicate file (PF) 231 for provision to the calculate condition unit (CCU) 233 for calculation of new predicate values and generation of a condition execution mask for operations in execution units (EUs) 248 of arithmetic logic channels (ALC0 241, ALC1 242, ALC2 243, and ALC3 244) and for operations in array access channels (AAC0, AAC1, AAC2, and AAC3) 250;

4. issuing literal values to arithmetic logic channels (ALC0 241, ALC1 242, ALC2 243, and ALC3 244) and array access channels (AAC0, AAC1, AAC2, and AAC3) 250;

5. issuing operations to arithmetic logic channels (ALC0 241, ALC1 242, ALC2 243, and ALC3 244);

6. issuing operations to array access channels (AAC0, AAC1, AAC2, and AAC3) 250; and 7. issuing operations to calculate condition unit (CCU) 233.

Control unit (CU) 120 also executes Control Transfer OPerations (CTOPs) and includes storage, collectively shown as special registers 224, which includes:

1. loop parameter and status registers (e.g., LPR, LSHR1, LSHR2, and LSHR3) used for loop control, and 2. base registers (BP) to address into predicate file 231 for control transfers and predicated execution modes.

Both the loop parameter and status registers and the base registers are software accessible for read and write.

Overlapped Loop Organization and Constraints

To compile loop code for overlapped execution, a compiler overlaps portions of the loop code corresponding to several subsequent iterations of the loop. Operations from the several iterations are represented, or overlapped, in a single stage. Designs for compilers providing overlapped iteration code are well known to persons of ordinary skill the art. See e.g., Dehnert et al., Compiling for the Cydra 5, *Journal of Supercomputing*, 7, 181–227 (1993). Such compilers implement variations on a technique known as software pipelining.

Two types of iterations should be distinguished. In particular, logical iterations of the initial loop code (i.e., iterations as represented in the loop code before compiling) contrast with the physical iterations of a software pipelined loop. Multiple logical iterations are overlapped in a given physical iteration. In overlapped loop code, where the number of overlapped logical iterations in a given physical iteration is NOVL, NOVL physical iterations must be executed to complete a logical iteration. In other words, each logical iteration is executed in NOVL stages. If the initial loop code has NLI logical iterations, then the overlapped, pipelined loop should have NPI physical iterations where:

$$NPI=NLI+(NOVL-1).$$

Figure 3:
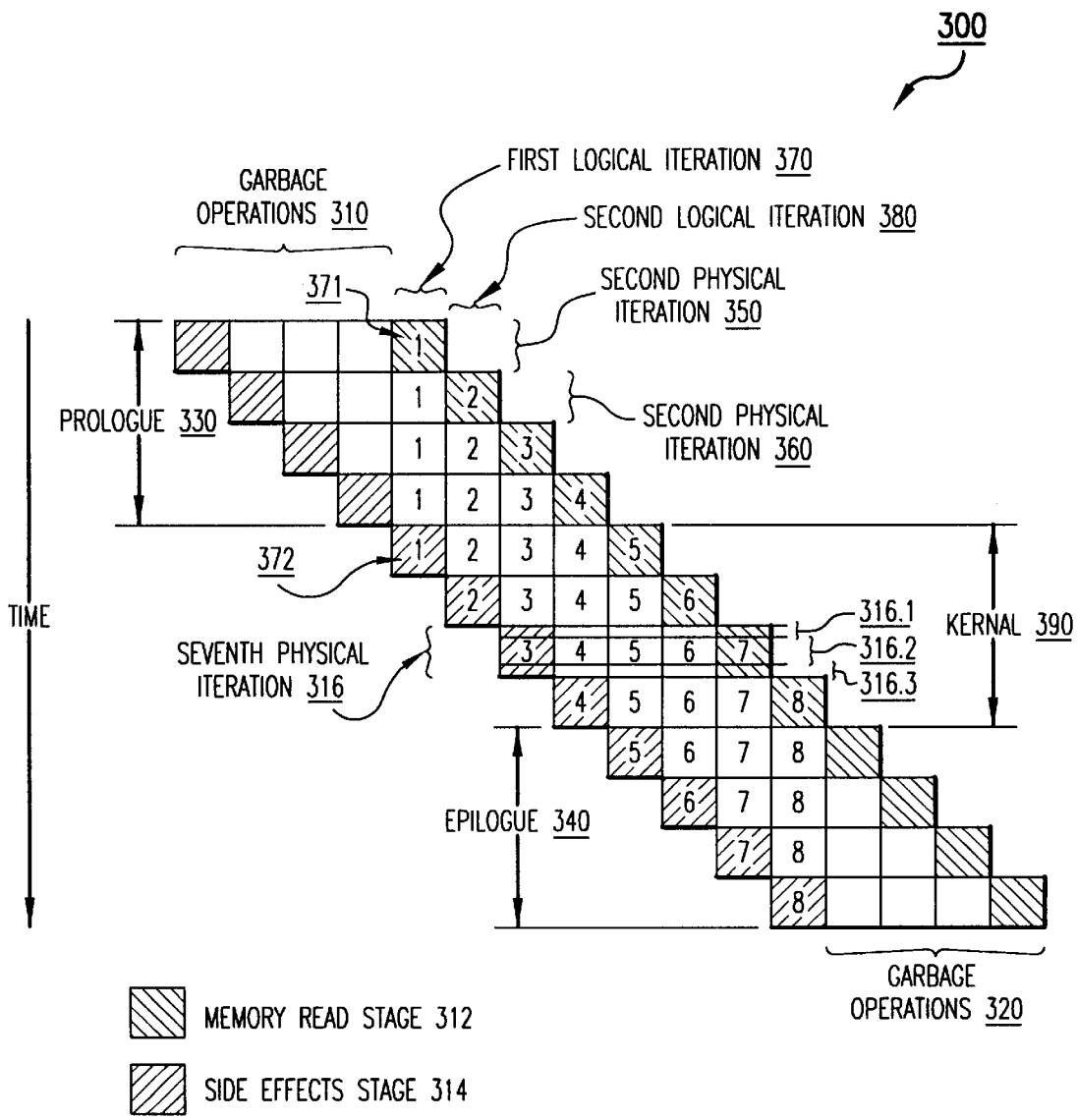
FIG. 3 is a pictorial illustration of loop scheduling of a simple inner loop in accordance with the teachings of the present invention.

FIG. 3 depicts a loop schedule 300 including iterations of loop body code compiled for execution on VLIW processor 200. Loop schedule 300 is illustrative of a simple loop, i.e., single level, unnested loop, and also illustrative of an inner loop, i.e., a innermost loop nested within one or more levels of outer loops. Logical iterations (e.g., first logical iteration 370 and second logical iteration 380) and physical iterations (e.g., first physical iteration 350 and second physical iteration 360) are both illustrated in FIG. 3. Five logical iterations are overlapped in each physical iteration and each logical iteration is executed in five stages.

During execution of a kernel portion 390 of the loop body, operations from respective stages of five logical iterations are executed at execution units of VLIW processor 200. For example, during the seventh physical iteration 316, stages of logical iterations 3, 4, 5, 6, and 7 are executed. A single physical iteration can require the evaluation of more than one long instruction word, i.e., "n" long instruction words evaluated in "n" cycles such as 316.1, 316.2, and 316.3. However, not every very long instruction required for a physical iteration will contribute an operation to the set of operations evaluated for a stage of a logical iteration, i.e., some cycles will not contribute an operation to some stages. Unlike the physical iterations of kernel portion 390, physical iterations of prologue 330 and epilogue 340 portions of the loop body do not include a full set of stages. In particular, during prologue portion 330 (i.e., during the first NOVL−1 physical iterations of loop body 300) certain stages include garbage operations 310 which are associated with non-existent logical iterations. Similarly, during epilogue portion 340 (i.e., during the last NOVL−1 physical iterations of loop body 300) garbage operations 320 are associated with other non-existent logical iterations.

In each case, these garbage operations (310 and 320) arise because each physical iteration of loop body 300 includes the same set of operations, encoded by the one or more VLIW instruction cycles which make up a physical iteration. However, despite the full set of operations encoded for a physical iteration of loop body code, only one valid stage exists in the first physical iteration 350, only two valid stages exist in the second physical iteration 360, etc., until all five stages are valid in the initial physical iteration of kernel portion 390 (i.e., physical iteration NOVL). Garbage operations 310 are the invalid operations. Garbage operations 320 are similar, but result from increasing numbers of stages containing invalid operations during the epilogue portion 340 of loop body 300.

Unlike the Cydra 5 which provided prologue/epilogue control by exploiting predicated execution codings to successively enable additional stages during successive physical iterations of the prologue and to successively disable stages during successive physical iterations of the epilogue, the prologue/epilogue control technique implemented by control logic 220 of VLIW processor 200 selectively enables and disables the execution of categories of operations. Although the prologue/epilogue control technique is not a general solution for all simple or inner loop body code, the technique can be applied to a large class of loop programs. In addition, the technique and its implementation lay a foundation for addtional architectural support for nested loops as described herein.

Prologue/epilogue control in accordance with the present invention requires that loop body code conform to two reasonable constraints on the structure of the pipelined logical iterations. In particular, the constraints are as follows:

memory read operations (e.g., loads) must be located in the first stage of a logical iteration; and operations with side-effects (e.g., memory write operations or stores, loop breaks, etc.) must be located in the last stage of a logical iteration.

Suitable compiler techniques to provide loop body code in accordance with these constraints are well known to those of ordinary skill in the art and loop body code is compiled using any such suitable techniques. Referring to FIG. 3, the restriction of memory read operations to memory read stages 312 and of operations having side-effects to side-effects stages 314 is illustrative of loop body code structured in accordance with the above constraints. In particular, memory read operations associated with logical iteration 370 are constrained to the first stage 371 of the logical iteration. Similarly, side-effects operations associated with logical iteration are constrained to the last stage 372 of the logical iteration.

Although not every loop can be structured in accordance with these constraints, the constraints are not as dramatic as they might appear. An overwhelming majority of loops in known benchmarks are compatible them and can advantageously exploit the specialized loop control logic described below. If, on the other hand, a particular loop body cannot be structured in accordance with the above constraints, the hardware support provided by the specialized loop control logic can be selectively disabled in favor of the Cydra 5 approach in which the compiler takes on responsibility for providing predicated execution encodings to maintain prologue/epilogue control.

Figure 4:
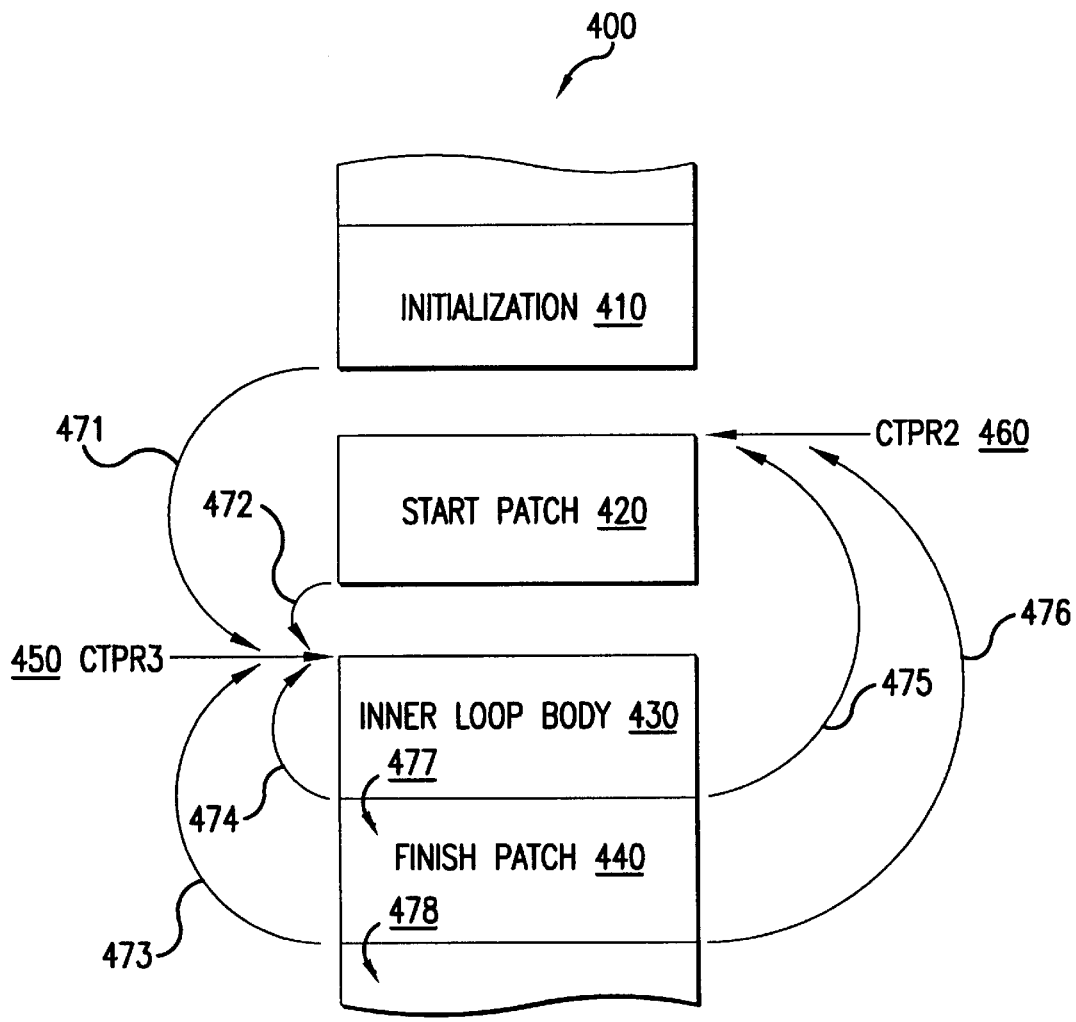
FIG. 4 is a pictorial illustration of the structure of nested loop code compiled for execution in accordance with the teachings of the present invention.

Extensions for nested loops are now described with reference to FIGS. 4, 5A, and 5B. FIG. 4 illustrates the structure of nested loop code 400 compiled for execution on a processor such as VLIW processor 200. Nested loop code 400 corresponds to source code, illustratively of the form shown below.

```
#define OUTER_LOOP_LIMIT   3
#define INNER_LOOP_LIMIT   6
for (i=1; i<=OUTER_LOOP_LIMIT; i++) {
    /* Upper portion */
    ...
    for (j=1; j<=INNER_LOOP_LIMIT; j++) {
        /* Inner loop body */
        ...
    }
    /* Lower portion */
    ...
}
```

Nested loop code 400 (which is a compiled software pipelined representation of the illustrative nested loop source, above) includes initialization code 410, a start patch 420, inner loop body code 430, and a finish patch 440. Initialization code 410 includes code for initializing loop control registers and control transfer preparation registers (i.e., CTPR2 214, and CTPR3 215). Initialization code 410 also includes code from an upper portion of the outer loop and startup code for loading array address registers with initial values for the first iteration of the inner loop. Inner loop body code 430 corresponds to the inner loop source code shown above, compiled in accordance with the previously described loop constraints, i.e., that memory read operations must be located in the first stage of a logical iteration and operations with side-effects must be located in the last stage of a logical iteration.

As a general matter, the upper and lower portions of the above source code are represented as compiled code in start patch 420 and finish patch 440, respectively. Nonetheless, persons of ordinary skill in the art will recognize that suitable compilers will typically perform data dependency analysis. Such compilers may identify and exploit optimizations which may result in an execution ordering of operations which differs from that in the source code. As a result, it is possible that some operations corresponding to statements in the upper portion of the above source code may be represented in a lower portion of the compiled outer loop body code. Similarly, some operations corresponding to statements in the lower portion of the source code may be represented in an upper portion of the compiled outer loop body code. The upper and lower portions of the compiled outer loop code are discussed below.

Start patch 420 includes code corresponding to an upper portion, if any, of the compiled outer loop and also includes code for initializing a next inner loop, i.e., loading loop control registers and array address registers with initial values for a next series of iterations through the inner loop. Finish patch 440 includes code for saving the results of a completed inner loop and code corresponding to a lower portion, if any, of the compiled outer loop. If the inner loop simply calculates and stores elements of an array, there are no results for finish patch 440 to save. However, in the case of an inner loop which calculates a recurrent variable, the recurrent variable instance associated with a particular inner loop must be saved, i.e., moved from working register vectors to make room for a recurrent variable instance associated with the next inner loop (i.e., associated with the inner loop included within the next iteration of the outer loop). Finish patch 440 also includes code for checking an outer loop counter and for loading a subset of the array address registers. If the outer loop counter is not exhausted, finish patch 440 code initializes a subset of the array address registers dedicated to storing results to memory from within the next inner loop (i.e., from within the inner loop included within the next iteration of the outer loop). Regarding array address registers, some supply address values for inner loop read and write operations, while others supply address values for outer loop operations. Those supplying address values for inner loop operations must be reloaded between the last and first logical iterations of adjacent inner loops. Array address registers supplying read addresses for inner loop operations are reloaded by start patch 420, while those supplying write addresses for inner loop operations are reloaded in finish patch 440.

Outer loop status must be separately maintained for upper and lower portions of the outer loop. For example, an outer loop counter variable must be duplicated: one for successive instances of start patch 420 and one for succesive instances of finish patch 440.

Control transfers in nested loop code 400 compiled for execution on VLIW processor 200 are also illustrated in FIG. 4. From initialization code 410, control is transferred to inner loop body code 430 (control transfer 471), which is identified using the contents of CTPR3 450. At the end of a physical iteration of inner loop body code 430, control is transferred to finish patch 440 (control transfer 477), to start patch 420 (control transfer 475), or back to inner loop body code 430 (control transfer 474), depending on loop state. Start patch 420 code is identified using the contents of CTPR2 460. At the end of start patch 420, control is transfered to inner loop body code 430 (control transfer 472). At the end of a finish patch 440, control is transferred to subsequent code (control transfer 478), to start patch 420 (control transfer 476), or back to inner loop body code 430 (control transfer 473), depending on loop state.

Figure 5A:
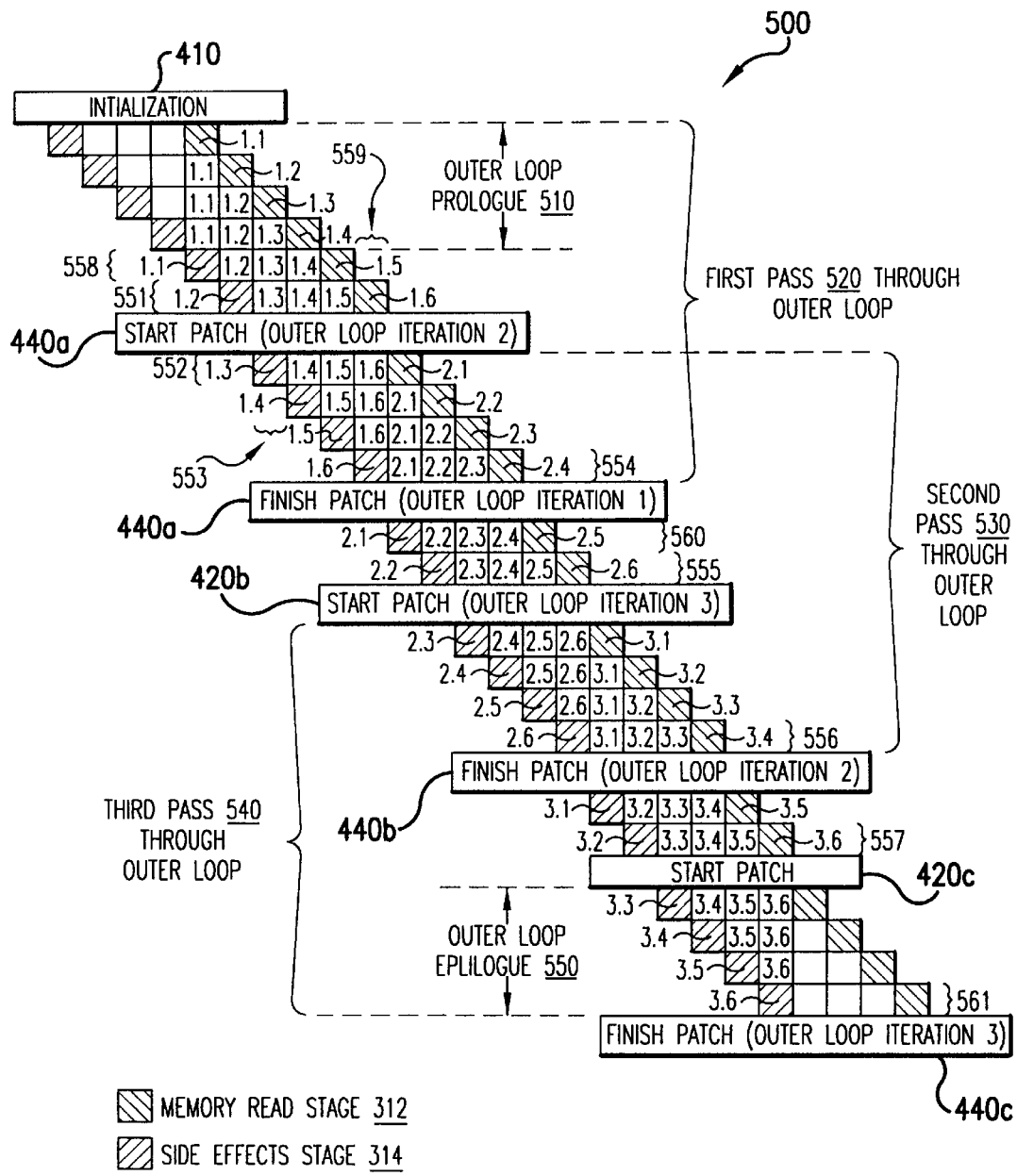
FIGS. 5A and 5B are pictorial illustrations of nested loop scheduling in accordance with the teachings of the present invention.
Figure 5B:
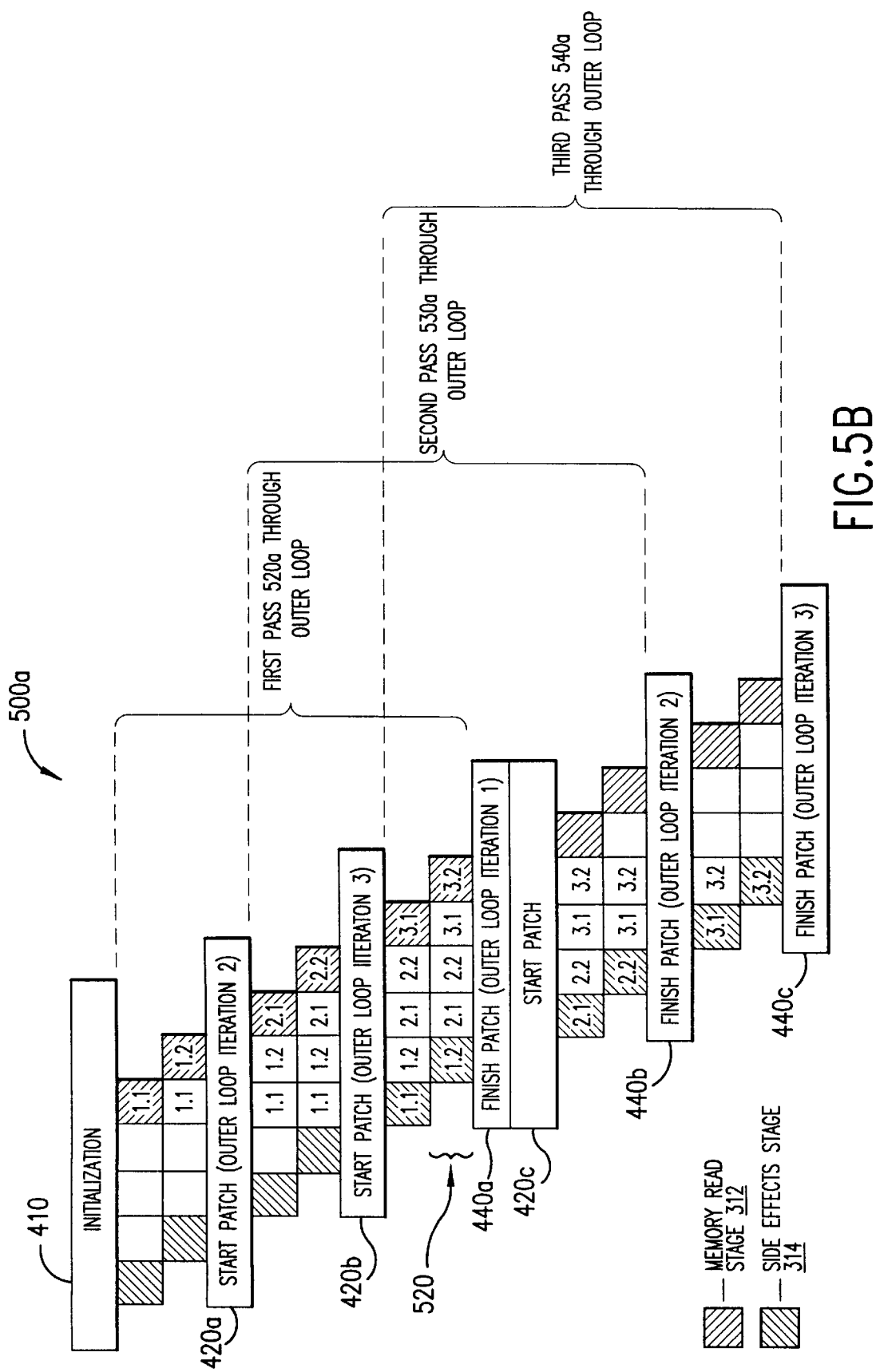

The nested loop schedules of FIGS. 5A and 5B further illustrate the overlapped loop organization of nested loops for execution on VLIW processor 200 in accordance with the present invention. Nested loop schedule 500 corresponds to the above source code having a six (6) iteration inner loop within a three (3) iteration outer loop. Three passes through the outer loop are shown in FIG. 5A as overlapped portions 520, 530, and 540 of loop schedule 500. Note that, as will be further illustrated below, the execution of operations associated with successive passes through the outer loop, including inner loop operations associated with successive passes through the outer loop, are overlapped.

Nested loop schedule 500 begins with initialization code 410, which in an embodiment for execution on VLIW processor 200 includes one or more long instruction words encoding one or more initialization operations. Nested loop schedule 500 continues with physical iterations of inner loop body code. In the loop schedule of FIG. 5A, six (6) physical iterations of inner loop body code follow initialization code 410. Successive, 5-stage logical iterations of the inner loop begin during each of the first six physical iterations. As with the simple inner loop schedule of FIG. 3, the first NOVL−1 physical iterations make up a prologue period 510 of the outer loop and include garbage operations.

The first logical iteration of the inner loop is completed during the fifth physical iteration 558 of inner loop body code 430. During the sixth physical iteration 551 of inner loop body code 430, the first stage of the final logical iteration 559 of the inner loop is executed. Thereafter, start patch instance 420a initiates the second pass through the outer loop, including operations from an upper portion, if any, of the compiled outer loop and including operations for initializing a next inner loop, i.e., loading loop control registers and array address registers with initial values for a next series of iterations through the inner loop. Implicit in the loop schedule of FIG. 5A is a control transfer 475 from loop body code 430 to start patch instance 420a and a return control transfer 472 to loop body code 430. Physical iterations of inner loop body 430 continue at physical iteration 552. In partcular, physical iteration 552 includes the remaining stages of inner loop logical iterations 3, 4, 5, and 6 from the first outer loop iteration (i.e., stages of logical iterations 1.3, 1.4, 1.5, and 1.6 executed as part of physical iteration 552) and includes the first stage of the first logical iteration of the inner loop from the second outer loop iteration (i.e., the first stage of logical iteration 2.1).

Physical iterations of inner loop body 430 continue until the last stage of the last logical iteration of the inner loop associated with the first pass through the outer loop (i.e., until the physical iteration which includes the memory side effects stage 1.6 of logical iteration 559). Thereafter, finish patch instance 440a saves recurrent variable instances for the six completed iterations the inner loop, executes code corresponding to a lower portion, if any, of the compiled outer loop, and checks an outer loop counter. Since the outer loop counter is yet not exhausted (completion of two more passes through outer loop is required), finish patch instance 440a loads the subset of the array address registers with values for writing results of next inner loop (i.e., of the inner loop included within the next iteration of the outer loop). For example, a typical data structure for processing in a nested loop is a 2-dimensional matrix, A[n,m]. Suppose, therefore that the inner loop traverses the i-th column of A[n,m]. Then, to initialize an array address register for inner loop iterations included within the next (i.e., i-th) iteration of the outer loop, finish patch 440 reloads the array address register with the address of the A[i,0] element.

Implicit in the loop schedule of FIG. 5A is a control transfer 477 (fall through) from loop body code 430 to finish patch instance 440a and a return control transfer 473 to loop body code 430. Physical iterations of inner loop body 430 continue at physical iteration 560 with the remaining stages of inner loop logical iterations 1, 2, 3, 4, and 5 from the second pass through the outer loop (i.e., continue with stages of logical iterations 2.1, 2.2, 2.3, 2.4, and 2.5 executed as part of physical iteration 560).

The sequence of physical iterations, control transfers to and from start patch 420, and control transfers to and from finish patch 440 continues through loop schedule 500, with control transfers to and from start patch 420 following physical iterations which include the first stage of the last logical iteration of a given series of inner loop iterations, and with control transfers to and from finish patch 440 following physical iterations which include the last stage of the last logical iteration of a given series of inner loop iterations. Illustratively, loop schedule 500 includes control transfers to and from start patch 420 after physical iteration 555 (control transfer to/from start patch instance 420b) and after physical iteration 557 (control transfer to/from start patch instance 420c). Similarly, loop schedule 500 includes control transfers to and from finish patch 440 after physical iteration 556

(control transfer to/from finish patch instance 440*b*) and after physical iteration 561 (control transfer to/from finish patch instance 440*c*).

Certain start patch operations are unnecessary for start patch instance 420*c*. For example, the outer loop "upper portion" operations, array address register loads, and certain loop control register updates can be skipped. On the other hand, there is no harm if, for example, reloading of array address registers is skipped because there is no next inner loop to use them. Alternative embodiments may skip or execute the outer loop "upper portion" operations, array address register loads, and most loop control register updates as desired for code efficiency. In the exemplary loop control register embodiment described herein, only the reloading of an inner loop counter register in start patch instance 420*c* is constrained. Since in the loop control logic embodiment of FIG. 6, a zero value of current loop counter field (clc) 645 (see FIG. 6) distinguishes the epilogue period, the compiler ensures that the zero value is provided. A variety of alternative approaches are possible. For example, the compiler may include a condition in start patch 420 such that start patch instance 420*c* skips reloading of current loop counter field (clc) 645, or alternatively, the compiler may include a code in start patch 420 reload the zero value in start patch instance 420*c*, etc.

The final NOVL−1 physical iterations of loop body code (ending with physical iteration 561) are the epilogue period 550 of the outer loop. As with the epilogue period of simple inner loop 300, epilogue period 550 includes garbage operations. However, note that prologue period 510 and epilogue period 550 are amortized across a total of 18 inner loop logical iterations (i.e., 3 outer loop passes×6 inner loop iterations) together with upper and lower portions of each pass through the outer loop, all of which are software pipelined.

FIG. 5B depicts a loop schedule 500*a* which is analogous to that shown in FIG. 5A. In particular, loop schedule 500*a* corresponds to loop code compiled from loop source code such as that described above, but for which INNER__LOOP_LIMIT is equal to 2. The overlapping of inner and outer loop code is more dramatically shown in FIG. 5B than previously in FIG. 5A. For example, 1. the fifth stage of a second logical iteration (1.2) of the inner loop associated with the first pass through the outer loop;
2. the fourth stage of a first logical iteration (2.1) of the inner loop associated with the second pass through the outer loop;
3. the third stage of a second logical iteration (2.2) of the inner loop associated with the second pass through the outer loop;
4. the second stage of a first logical iteration (3.1) of the inner loop associated with the third pass through the outer loop; and
5. the first stage of a second logical iteration (3.2) of the inner loop associated with the third pass through the outer loop, are all overlapped in physical iteration 590. Software pipelining of outer loop code is illustrated by the execution of the upper portion of outer loop pass 3 (see start patch instance 420*b*) before execution of the lower portion of outer loop pass 1 (see finish patch instance 440*a*).

Loop Control Implementation

VLIW processor 200 introduces several architectural features for controlling the execution of nested loop code in accordance with the loop schedules depicted in FIGS. 5A and 5B. In particular, VLIW processor 200 includes loop control registers and logic for controlling prologue and epilogue portions of loop code and also includes control transfer preparation registers and logic for implementing multiway control transfers, each of which are described below. Operations in the stream of long instructions initialize and modify loop control registers and trigger control transfers.

Prologue/Epilogue Control Logic

Figure 6:
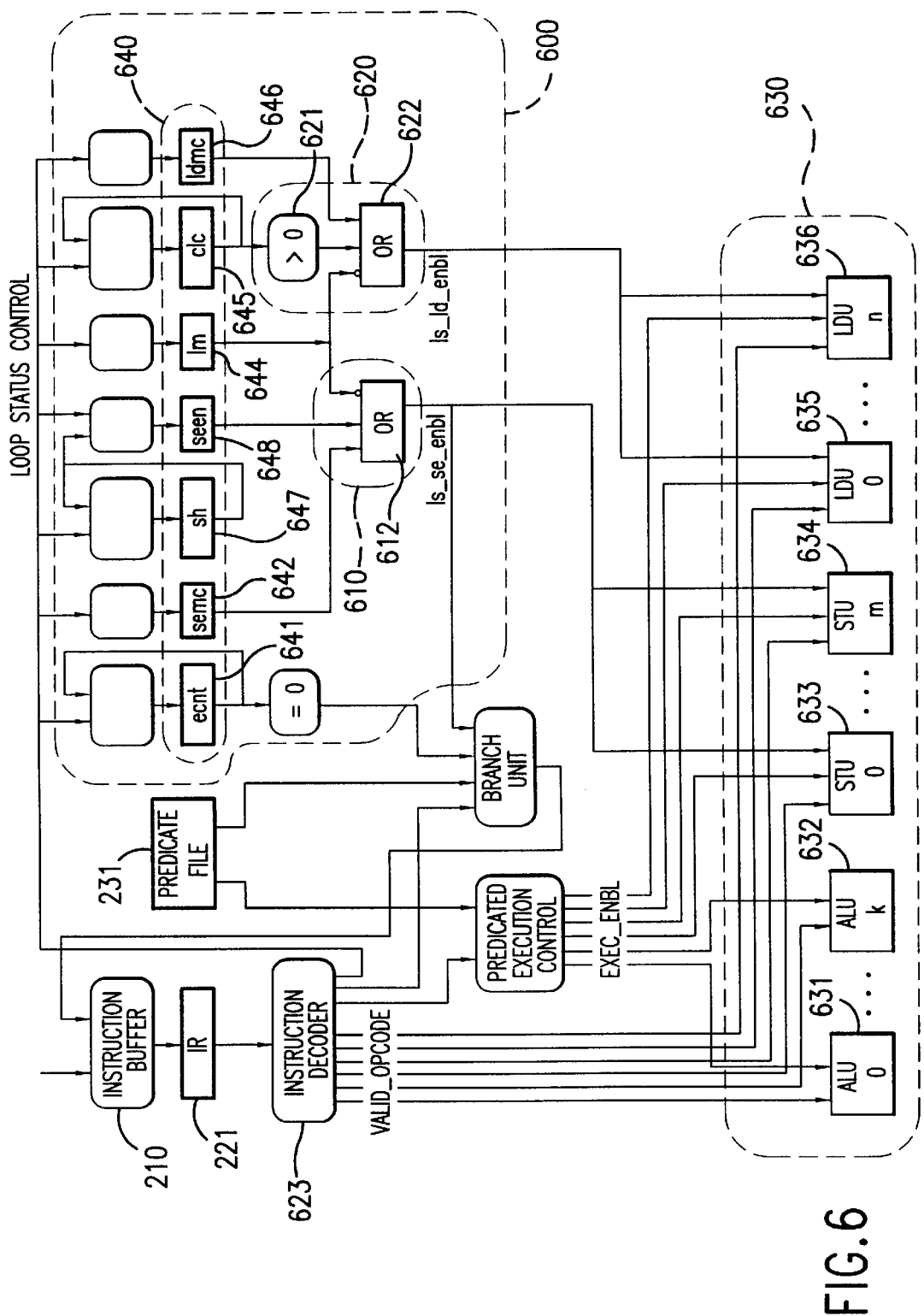
FIG. 6 is a block diagram of loop control logic constructed in accordance with the teachings of the present invention.

FIG. 6 depicts loop control logic 600 of VLIW processor 200 which provide prologue and epilogue control. Loop control logic 600 is coupled to receive values for loop control variables from instruction decoder 623. These values are used to initialize fields of various loop parameters and loop control registers (collectively shown as loop parameter and status registers 640). In particular, these values initialize an epilogue counter field (ecnt) 641, a shift register (sh) 647, a side-effects enabled flag (seen) 648, a current loop counter field (clc) 645, a loop mode flag (lm) 644, and side-effects manual control (semc) and loads manual control (ldmc) flags (642 and 646). Side-effects enabling logic 610 and load enabling logic 620 respectively issue the side-effects enabled predicate (ls_se_enbl) and the loads enabled predicate (ls_ld_enbl) to respective subsets of execution units illustratively grouped as 630.

Operation of these loop control registers and predicate logic in controlling prologue and epilogue loop periods is summarized below. However, a more detailed description is included in (a) a co-pending patent application entitled "Architectural Support for Execution Control of Prologue and Epilogue Periods of Loops in a VLIW processor," Ser. No. 08/733,480, naming Babaian et al. as inventors and filed on even date herewith, and (b) the corresponding PCT international application designating the United States of America (serial no. PCT/RU96/00213), the detailed descriptions of which are incorporated herein by reference.

$STU_0$ 633 through $STU_m$ 634 are illustrative of a first group of execution units 248 which implement operations with side-effects and which are distributed among ALC1 242 and ALC3 244 as described above with reference to FIG. 2. $STU_0$ 633 through $STU_m$ 634 are also illustrative of array access channels (AAC1 and AAC3) 250. $STU_0$ 633 through $STU_m$ 634 are each responsive to the ls_se_enbl predicate, enabling side-effects operations when ls_se_enbl is asserted and disabling side-effects operations when ls_se_enbl is de-asserted.

$LDU_0$ 635 through $LDU_n$ 636 are similarly illustrative of a second group of execution units 248 which implement load operations and which are distributed among ALC1 242 and ALC3 244 as described above with reference to FIG. 2. $LDU_0$ 635 through $LDU_n$ 636 are also illustrative of array access channels (AAC0, AAC1, AAC2, and AAC3) 250. $LDU_0$ 635 through $LDU_n$ 636 are each responsive to the ls_ld_enbl predicate, enabling load operations when ls_ld_enbl is asserted and disabling side-effects operations when ls_ld_enbl is de-asserted. Array access channels (AAC0, AAC1, AAC2, and AAC3) 250 are also described in (a) the co-pending patent application entitled "Array Prefetch Algorithm," Ser. No. 08/733,831, naming Babaian et al. as inventors and filed on even date herewith, and (b) the corresponding PCT international application designating the United States of America (serial no. PCT/RU96/00217), the detailed descriptions of which are incorporated herein by reference.

$ALU_0$ 631 through $ALU_k$ 632 are illustrative of a third group of execution units which implement arithmetic and logic operations (i.e., non-load and non-side-effects operations) and which are distributed among ALC0 241, ALC1 242, ALC2 243, and ALC3 244 as described above with reference to FIG. 2. The operation of $ALU_0$ 631 through $ALU_k$ 632 is unaffected by the state of either the ls_se_enbl predicate or the ls_ld_enbl predicate.

Side-effects enabling logic 610 and load enabling logic 620 are depicted functionally in FIG. 6. Side-effects enabling logic 610 implements the following predicate:

ls_se_enbl=!lm||seen||semc;

while load enabling logic 620 implements:

ls_ld_enbl=!lm||(clc>0)||ldmc;

Those of ordinary skill in the art will recognize a variety of alternative implementations for the functionality of side-effects enabling logic 610 and load enabling logic 620. For example, although the embodiment of FIG. 6 is shown with comparison logic (e.g., less than zero comparison logic 621) and OR gates (e.g., OR gates 612 and 622), side-effects enabling logic 610 and load enabling logic 620 may be implemented in positive or negative logic, using AND, OR, NAND, or NOR gates, etc. Suitable transformations of the respective logic equations will be appreciated by those of ordinary skill in the art. Additionally, the initialization and transition sequencing of register fields may be alternately defined with suitable modifications to the logic equations. Similarly, many suitable designs for comparing register values to trigger values will be appreciated by those of ordinary skill in the art. Side-effects enabling logic 610 and load enabling logic 620 are of any such suitable designs.

Loop Parameter and Status Registers

Figure 7A:
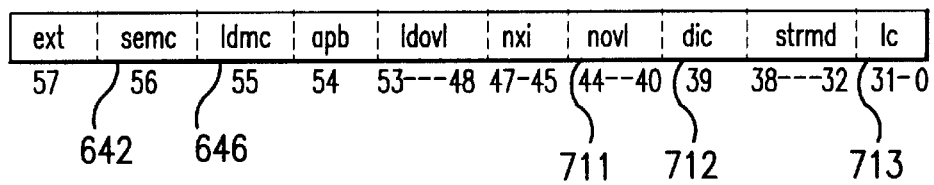
FIGS. 7A, 7B, and 7C are register structure diagrams for loop parameter and loop state storage in accordance with the teachings of the present invention.
Figure 7B:
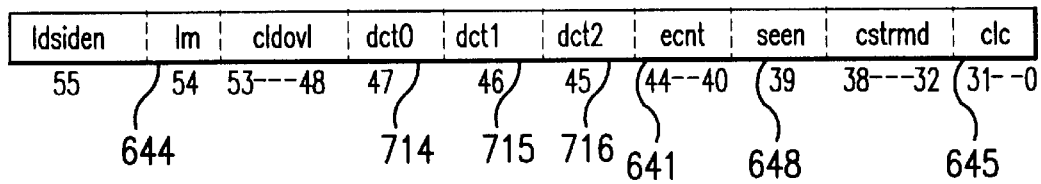
Figure 7C:
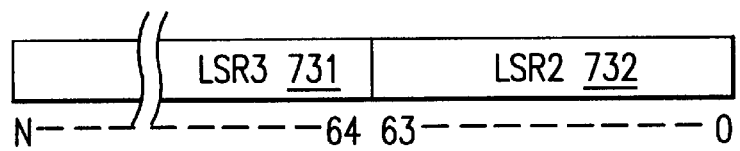

FIGS. 7A, 7B, and 7C depict exemplary embodiments of loop parameter and status registers 640 for maintaining loop state information to control nested loop execution. Field values from loop parameter and status registers 640 are used by loop control logic 600 and by multi-way control transfer logic 800 (described below). FIG. 7A depicts an illustrative organization of Loop Parameters Register (LPR) 710 which resides in control unit 220. Loop Parameters Register (LPR) 710 provides storage for both statically known and dynamically calculated loop attributes. Loop Parameters Register (LPR) 710 includes the side effects manual control (semc) and loop loads manual control (ldmc) fields (642 and 646) described above for selectively enabling and disabling the prologue and epilogue control features described above. Loop Parameters Register (LPR) 710 also includes storage for a decrement loop counter flag (dlc) 712, a number of overlapped logical iterations minus one field (novl) 711 and an initial loop counter value field (lc) 713.

FIG. 7B depicts an illustrative organization of Loop State Register 1 (LSR1) 720 which also resides in control unit 220. Loop State Register 1 (LSR1) 720 includes storage for the loop mode flag (lm) 644, the epilogue counter field (ecnt) 641, the side-effects enabled flag (seen) 648, and the current loop counter field (clc) 645 described above. The loop mode flag (lm) 644 is set for executing inner loop body code and cleared on inner loop body exit. During epilogue period 550, epilogue counter field (ecnt) 641 counts down to zero (0) from a value equal to that stored in novl 711. Side-effects enabled flag (seen) 648 acts as a sticky bit representation of bit zero (sh[0]) of shift register, sh 647 which is described below. Current loop counter field (clc) 645 is decremented during each non-epilogue physical iteration of loop schedule 500 and reloaded with a value from initial loop counter value field (lc) 713 at the beginning of set of iterations through the inner loop body code. Deferred control transfer flags dct0 714, dct1 715, and dct2 716 save control transfer conditions until transfer has been implemented. For example, the transfer along a lower priority branch is deferred if a branch having a higher priority is also triggered.

FIG. 7C depicts an illustrative implementation of shift register, sh 647, which includes two concatenated registers, a 64-bit Loop State Register 2 (LSR2) 732 and Loop State Register 3 (LSR3) 731. LSR2 732 and LSR3 731 respectively provide storage for the lower and upper parts of the shift register, sh 647. Shift register, sh 647, marks the last physical iterations of multiple overlapped inner loop bodies (i.e., shift register, sh 647, marks, for each overlapped pass through the outer loop, the final physical iteration of the last logical iteration of inner loop body code). In the embodiment described herein, individual bits of shift register, sh 647, are set during loop initialization code 410 and start patches (e.g., start patches instances 420a, 420b, and 420c) and shift right in correspondence with successive physical iterations of inner loop body code. Except during prologue period 510, a set value in bit one (sh[1]) of shift register, sh 647, indicates the last physical iteration of the last logical iteration in a corresponding pass though the outer loop In this way, shift register, sh 647, encodes completion points for multiple inner loop bodies nested within overlapped passes through an outer loop.

In the embodiment of FIG. 7C, the aggregate length of the sh 647 depends on the size (MAXAPB) of an array prefetch buffer, and is equal to

32+MAXAPB/2.

In the embodiment of FIG. 7c, bits 0 to 63 of sh 647 are represented in LSR2 732, while bits 64 to (32+MAXAPB/2) are represented in LSR3 731. Depending on the design of the array prefetch buffer, implementations of LSR3 731 and LSR2 732 may be of alternate lengths. Moreover, LSR3 731 may be omitted. The array prefetch buffer is described in greater detail in (a) the co-pending patent application entitled "Array Prefetch Algorithm," Ser. No. 08/733,831, naming Babaian et al. as inventors and filed on even date herewith, and (b) the corresponding PCT international application designating the United States of America (serial no. PCT/RU96/00217), the detailed descriptions of which are incorporated herein by reference.

Multi-Way Control Transfer Logic

Figure 8:
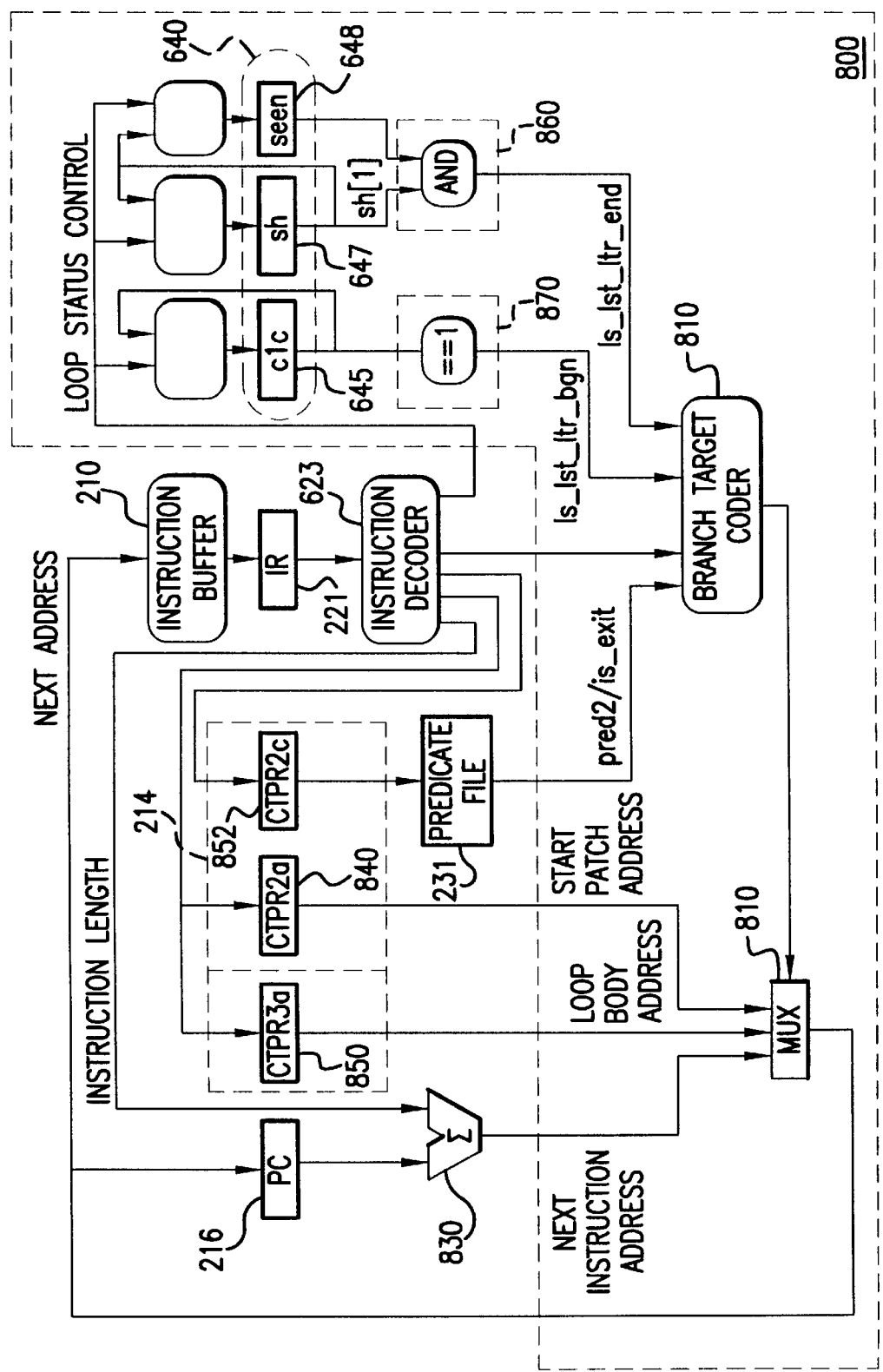
FIG. 8 is a pictorial illustration of control transfer logic constructed in accordance with the teachings of the present invention.

FIG. 8 depicts an exemplary embodiment of multi-way control transfer logic 800. Multi-way control transfer logic 800 includes multiplexer 810 which supplies a next address selected from an incremented next instruction address, a start patch address, and a loop body address. The next instruction address is supplied to multiplexer 810 by adder 830 based on a program counter value supplied from Program Counter register (PC) register 832 and an instruction length supplied from instruction decoder 623. In the embodiment of FIG. 8, the start patch and loop body addresses are respectively supplied from Control Transfer Preparation Registers (CTPR2a 840 and CTPR3a 850). Branch target coder 820 provides multiplexer 810 with an address selection signal based on an outer loop exit predicate (ls_exit) represented in predicate file 231, based on a last iteration begin predicate (ls_lst_itr_bgn), and based on a last iteration end predicate (ls_lst_itr_end). Branch target coder 820 also receives Control Transfer Operations (CTOPs) from instruction decoder 623.

Last iteration begin and end loop predicates (i.e., ls_lst_itr_bgn and ls_lst_itr_end) are respectively supplied by last iteration begin logic 870 and last iteration end logic 860 based on values stored in fields of various of loop parameter and loop status registers, which are collectively shown as loop parameter and status registers 640. In particular, last iteration begin logic 870 compares current loop counter field (clc) 645 to the value one (1), supplying a true predicate if current loop counter field (clc) 645 indicates that the current physical iteration begins the last logical iteration. The ls_lst_itr_bgn predicate is used by branch target coder 820 to identify points in a nested loop schedule for transfering control to start patch 420 (i.e., in the context of loop schedule 500, for transfering control to start patch instances 420a, 420b, and 420c). Upon receiving an appropriate Control Transfer OP (CTOP) from instruction decoder 623 and a true ls_lst_itr_bgn predicate from last iteration begin logic 870, branch target coder 820 supplies a address selection signal selective for the start patch address stored in Control Transfer Preparation Register (CTPR2a) 840.

In the embodiment of FIG. 8, values of current loop counter field (clc) 645 from LPR.lc to one (1) indicate valid logical iterations. The zero (0) value indicates the epilogue period. Alternate encodings for identifying the beginning of the last logical iteration of an inner loop body will be appreciated by those of ordinary skill in the art. For example, a shift register configuration, a count up (rather than count down) configuration, alternate counter base points, etc. are all suitable alternatives. Suitable corresponding design modifications to the predicate implemented by last iteration begin logic 870 will also be appreciated by those of ordinary skill in the art. Last iteration begin logic 870 is of any such suitable design.

In the embodiment of FIG. 8, last iteration end logic 860 supplies the last iteration end predicate (ls_lst_itr_end) if both the side-effects enabled flag (seen) 648 and bit one (sh[1]) of shift register, sh 647 are set. Side-effects enabled flag (seen) 648 is set at the end of prologue period 510 and marks the non-prologue portion of loop schedule 500. The last inner loop body code physical iterations associated with each of multiple overlapped outer loop passes are encoded by set bits of shift register, sh 647. The ls_lst_itr_end predicate is used by branch target coder 820 to identify points in an overlapped loop schedule for transfering control to finish patch 440 (i.e., in the context of loop schedule 500, for transfering control to finish patch instances 440a, 440b, and 440c). Upon receiving an appropriate Control Transfer OP (CTOP) from instruction decoder 623 and a true ls_lst_itr_end predicate from last iteration end logic 860, branch target coder 820 supplies a address selection signal selective for the finish patch address stored in Control Transfer Preparation Register (CTPR3a) 850.

As with the encodings for identifying the beginning of the last logical iteration of an inner loop body, alternate encodings for identifying the end of the last logical iteration of an inner loop body will be appreciated by those of ordinary skill in the art. Although a shift register configuration is presently preferred because of its efficient represent of multiple control transfer points in an overlapped loop schedule, multiple shift registers, multiple count up (or count down) iteration counters, etc. are all suitable alternatives Suitable corresponding design modifications to the predicate implemented by last iteration end logic 860 will also be appreciated by those of ordinary skill in the art. Last iteration end logic 860 is of any such suitable design.

For nested loop control as illustrated above in FIGS. 5A and 5B, branch target coder 820 supplies an address selection signal based on the particular Control Transfer OPeration (CTOP) received from instruction decoder 623 and based on the states of loop predicates such as ls_exit, ls_lst_itr_bgn, and ls_lst_itr_end. TABLE 1 characterizes the operation of an exemplary embodiment of branch target coder 820. Depending on the particular Control Transfer OP (CTOP) (see column 1) supplied from instruction decoder 623 and condition expression(s) (see colum 3) which evaluate(s) to true, branch target coder 820 selects one of four program paths (see colum 3) as indicated by the address from the corresponding Control Transfer Preparation Register (CTPRia).

TABLE 1

| CTOP | CTPRia Number | Condition Expression |
|---|---|---|
| 0 | | reserved |
| 1 | 0 | ls_lst_itr_end \|\| ls_break \|\| ls_prlg && LPR.ext |
| | 1 | false |
| | 2 | false |
| | 3 | true |
| 2 | 0 | ls_lst_itr_end \|\| ls_break \|\| ls_prlg && LPR.ext |
| | 1 | false |
| | 2 | ls_lst_itr_bgn |
| | 3 | true |
| 3 | 0 | ls_lst_itr_end \|\| ls_break \|\| ls_prlg && LPR.ext |
| | 1 | ls_lst_stat_bgn |
| | 2 | ls_lst_itr_bgn && !ls_ldovl_limit |
| | 3 | true |
| 4–5 | | reserved |
| 6 | 0 | LSR1.dct0 |
| | 1 | LSR1.dct1 |
| | 2 | LSR1.dct2 |
| | 3 | true |
| 7 | 0 | ls_exit |
| | 1 | LSR1.dct1 |
| | 2 | LSR1.dct2 |
| | 3 | true |

Loop control transfer semantics encode a "fall through," i.e., continuation with the next long instruction (according to the program counter value from Program Counter register (PC) register 832) as path 0, i.e., the address associated with "CTPR0a." Loop control condition expressions are prioritized from 0 to 3, with path 0 (fall through) having the highest priority. As a result, branch target coder 820 provides multiplexer 810 with an address selection signal selective for the next instruction address input from adder 830 if condition expression 0 evalutes to true. Similarly, branch target coder 820 provides multiplexer 810 with a address selection signal selective for the the start patch address from Control Transfer Preparation Register (CTPR2a) 840 if condition expressions 0 and 1 evaluate to false and condition expression 2 evaluates to true. Finally, branch target coder 820 provides multiplexer 810 with a address selection signal selective for the the loop body address from Control Transfer Preparation Register (CTPR3a) 850 if condition expressions 0, 1, and 2 evaluate to false and condition expression 3 evaluates to true.

Condition expression 1 and Control Transfer Preparation Register CTPR1a (not shown in FIG. 8) can be configured to control transfers to a middle patch for supporting nested loops with a prefetch buffer. Such a middle patch appears in a nested loop structure when an array prefetch algorithm (APA) is used. In an exemplary embodiment of an array prefetch algorithm, array prefetch logic inserts additional stages into inner loop logical iterations. In such a case, a logical iteration is divided into two portions. A dynamic portion of the divided logical iteration includes a first stage with loads (and only loads) together with additional "waiting for memory" stages. A static portion of the divided logical iteration (enabled by the ls_stat_enbl predicate) includes all statically compiled stages (with all operations but loads).

A start patch such as start patch 420:
1. reloads loop control registers;
2. reloads "read" address registers;
3. executes an upper port of the outer loop; and
4. initializes recurrent and invariant variables.

Absent the array prefetch algorithm, items 1, 2, 3, and 4 are performed between the load stages of adjacent inner loops, i.e., in the start patch. However, when the array prefetch algorithm is enabled, items 3 and 4 should be performed between the first stages of the static portions of the adjacent inner loops because only the static portions actually process data. Thus, a control transfer to a middle patch (via an additional multi-way branch limb encoded in CTPR1*a*) appears between the first static stages of adjacent inner loops. The branch to a middle patch occurs on a predicate (ls_lst_stat_bgn) indicating that the static part of the last logic iteration has begun. The array prefetch algorithm is described in greater detail in (a) the co-pending patent application entitled "Array Prefetch Algorithm," Ser. No. 08/733,831, naming Babaian et al. as inventors and filed on even date herewith, and (b) the corresponding PCT international application designating the United States of America (serial no. PCT/RU96/00217), the detailed descriptions of which are incorporated herein by reference.

Referring to TABLE 1, condition expression 0 for Control Transfer OPs (CTOPs) 1, 2, and 3 (i.e., ls_lst_itr_end||ls_ls_break||ls_prlg && LPR.ext) includes the ls_lst_itr end predicate and two additional terms, which are not closely related to the implementation of loop schedule 500. The ls_break term provides for inner loop exit on a condition from predicate file and the (ls_prlg && LPR. ext) term provides for handling of inner loop body code with an extension fragment for handling nested loops with vector invariants (where ls_prlg indicates the prologue period of each inner loop and ext is a flag in loop parameters register (LPR) 710).

A nested loop may include a variable which is constant in the inner loop but which is modified in the outer loop, so that each next inner loop must see a new value. During overlapped epilogue and prologue periods of adjacent inner loops, these adjacent loops must see different values for the same variable. Vectorizing the storage register for the inner loop invariant allows a particular vector element to correspond to each successive adjacent inner loop. In a start patch, such as start patch 420, the vector element corresponding to the first stage of inner loop body code 430 is updated with the inner loop invariant. Inner loop body code, such as inner loop body code 430, can include operations to copy the inner loop invariant to the next element stage by stage. Thus, the latter stages of a prior inner loop see the old value of the inner loop invariant, while the starting stages of a subsequent inner loop, though overlapped with the prior inner loop, see the new value of the inner loop invariant. To avoid the burden of copying operations, an exemplary embodiment of VLIW processor 200 allows for an extension fragment which collects inner loop invariant servicing operations. The extension fragment is appended to inner loop body code 430 and is executed only when necessary, i.e., as the prologue of a next in turn inner loop, on a fall through control transfer on the condition (ls_prlg && LPR. ext). A second rotatable area in predicate file 231 is included in VLIW processor 200 to support vectorized storage for the inner loop invariant independent of other vectorized loop variables.

The ls_ldovl_limit predicate in condition expression 0 for Control Transfer OPs (CTOPs) 1, 2, and 3 (see TABLE 1) is also not closely related to the implementation of loop schedule 500. Instead, the ls_ldovl_limit predicate provides support for branches in response to a maximum load overlap condition for array prefetch operations. Array prefetch operations are described in greater detail in (a) the co-pending patent application entitled "Array Prefetch Algorithm," Ser. No. 08/733,831, naming Babaian et al. as inventors and filed on even date herewith, and (b) the corresponding PCT international application designating the United States of America (serial no. PCT/RU06/00217), the detailed descriptions of which are incorporated herein by reference.

Alternative embodiments may modify condition expressions and Control Transfer OP (CTOP) definitions shown in TABLE 1 to extend loop control features beyond those necessary for control of nested loop schedules such as loop schedule 500. In addition, larger or smaller numbers of branch legs may be implemented and the fall through semantics of one of the branch legs (namely, that denoted CTPR0*a*) may be replaced with explicitly encoded control transfer addresses (as with CTPR2*a* dn CTPR3*a*).

Control Transfer Registers

In the exemplary embodiment of multi-way control transfer logic 800 described herein, execution of a control transfer operation is divided into two steps. The first step includes conditions calculation and encoding of a control transfer, if any, to take. The possible control transfers are described in Control Transfer Preparation Registers (CTPRS) which contain control transfer attributes. The particular CPTR transfer to take is encoded in a control transfer execution register (CTER) 930 (see FIG. 9) of branch target coder 820. This first step is executed along with the wide instruction that contains the control transfer operation and results in a CTPR number encoded in control transfer execution register (CTER) 930. The second step—the actual control transfer as indicated by CTER 930 encoding—is executed with the next long instruction. Alternative embodiments of multi-way control transfer logic 800 may provide single step branches, in which case control transfer execution register (CTER) 930 may be eliminated and branch target coder 820 selections may be coupled directly to multiplexer 810. Both delayed and non-delayed branch implementations are suitable.

Figure 9A:
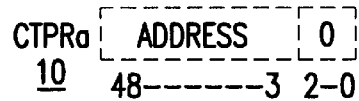
FIGS. 9A, 9B, and 9C are register structure diagrams for control transfer preparation and execution registers in accordance with the teachings of the present invention.
Figure 9B:
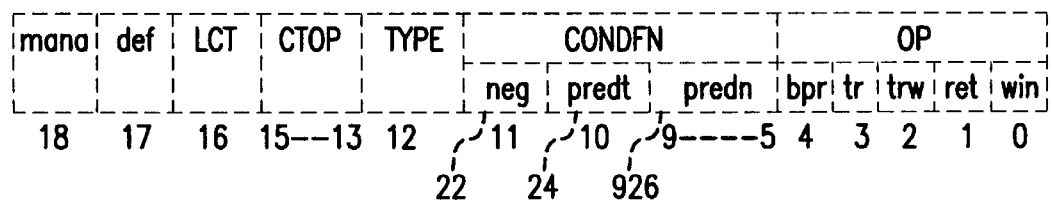
Figure 9C:
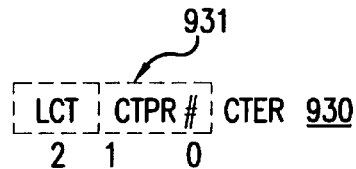

In the exemplary embodiment described herein, three (3) control transfer preparation registers are each implemented as two physical register—CTPRia and CTPRic—where i indicates CTPR 1, 2, or 3. Exemplary embodiments of CTPRa, CTPRC, and CTER registers are shown in FIGS. 9A, 9B, and 9C, respectively. Each CTPRia (illustratively, CTPRa 910) provides storage for the virtual address target of an associated control transfer, i. Each CTPRic (illustratively, CTPRc 920) provides storage for control transfer attributes, including encodings for conditional control transfers based on Boolean Predicate Register (BPR) values and for unconditional control transfers. The CONDFN fields (i.e., CONDFN. neg 922, CONDFN. predt 924, and CONDFN.predn 926) of CTPRC 920 respectively encode the sense of the predicate (i.e., which binary value is the true condition), the type of predicate addressing (as a address or as a modulo displacement in the predicate file), and the address/displaceent of the predicate. Although the exemplary embodiment of CTPR and CTER registers described herein is generally applicable to both scalar and loop control transfers, the description focuses on loop control transfers, i.e., on the role of CTPR and CTER registers as architectural support for software pipelined nested loops. The remaining fields of CTPRc 920 are primarily associated with scalar control transfers.

Outer loop exit predicate (ls_exit) supports outer loop termination by a condition encoded in predicate file 231, wherein:

ls_exit = (CTPR2c.TYPE == 1) &&

(pred2 xor CTPR2c.CONDFN.neg)

wherein a CTPR2c. TYPE of 1 indicates loop control transfer mode and wherein pred2 represents a logic predicate accessed from predicate file (BPR) 231 in the following way:

if (CTPR2c. CONDFN.predt == 0)

pred2 = BPR[CTPR2c.CONDFN.predn] ;

else pred2 = BPR[(BR.bpcur+ CTPR2c.CONDFN.predn) mod (BR.bpsz + 1)] ;

i.e., either directly or via a modulo displacement. The stored logic predicate corresponding to pred2 is computed and written to predicate file 231 by operations in the long instruction stream. Suitable predicate file designs and access method are well known in the art.

In the embodiment of FIG. 8, predicate file 231 is accessed using information stored in the fields of Control Transfer Preparation Register (CTPR2c) 852. The previously computed and stored logic predicate, pred2, which translates into the outer loop exit predicate (ls_exit) as described above, is used by branch target coder 820 identify an outer loop exit point in an overlapped loop schedule such as loop schedule 500. Upon receiving an appropriate Control Transfer OP (CTOP) from instruction decoder 623 (i.e., CTOP=7) and a true ls_exit predicate from predicate file 231, branch target coder 820 supplies a address selection signal selective for the next instruction address (fall through) from adder 830.

Each of the above control transfers is implemented as a two step process. The Control Transfer Preparation Register Number field (CTPR#) 931 of Control Transfer Execution Register (CTER) 930 encodes the direction of program execution as determined in the first step (conditions calculation) in accordance with Table 1. The second step, control transfer itself, is performed along with the next long instruction. If CTER.CTPR# is non-zero, branch target coder 820 supplies multiplexer 810 with an address selection signal selective for an address from the corresponding Control Transfer Preparation Register, i.e., CTPR1a (not shown), CTPR2a 840, or CTPR3a 850. A zero value of CTER. CTPR# is selective for the next instruction address from adder 830.

Control Operations in Loop Code

Referring again to FIG. 4, nested loop code 400 for execution on VLIW processor 200 includes Control Transfer Preparation (CTP) operations, operations encoding modifications and updates to loop parameter and status registers 640, and operations encoding multiway Control Transfer OPs (CTOPs). In an exemplary embodiment of nested loop code 400, initialization code 410 includes Control Transfer Preparation (CTP) operations which initialize Control Transfer Preparation Registers CTPR2a 840 and CTPR3a 850 with addresses of start patch 420 and inner loop body code 430, respectively. In addition, such CTP operations trigger cache fills of control transfer target code to instruction cache (IC) 282. CTP operations are performed once, i.e., in initialization code 410, for multiple Control Transfer OPs (CTOPs) in initialization code 410, start patch 420, inner loop body code 430, and finish patch 440 portions of nested loop code 400. In the exemplary embodiment described herein, CTP operations encode the target and nature of an associated control transfer, while Control Transfer OPs (CTOPs) encode the control transfer itself. In this way, Control Transfer OPs (CTOPs) can be encoded limit impact on the size of inner loop body code 430. In the exemplary embodiment described herein, a Control Transfer OP (CTOP) is encoded in 4 bits.

Initialization code 410 also initializes loop parameter and status registers 640 with a register write operation to an aliased loop register (LR). Loop register (LR) is an alias for a variety of underlying fields of loop parameters register (LPR) 710, loop state register 1 (LSR1) 720, and shift register, sh 647. A register write of rw_data to LR provides a single operation (OP) method for initializing loop parameter and status registers 640. Alternatively, multiple OPs methods for initializing loop parameter and status registers 640 are also suitable, though less efficient of long instruction word space and execution time. The register write of rw_data to LR initializes the underlying fields of loop parameter and status registers 640 as follows:

rw_data=rs1 XOR rs2;
LPR=rw_data;
LSR1.clc=rw_data.lc;
LSR1.cstrmd=rw_data.strmd;
LSR1.ecnt=rw_data.novl;
LSR1.dct0=0;
LSR1.dct1=0;
LSR1.dct2=0;
LSR1.lm=0;
LSR1.cldovl=0;
LSR1.seen=(rw_data.novl+rw_data.nxi)==0;
LSR1.ldsiden=1;
LSR2.sh=1<<(rw_data.novl+rw_data.nxi);

where the (rw_data. novl+rw_data.nxi) term in the initialization expressions is selective for a particular bit of shift register, sh 647. The nxi term provides support for auxiliary logical iterations for reduction of common subexpressions, maintaining of recurrent dependencies, etc. using extension code interposed between inner loop body code 430 and finish patch 440. However, absent extension code, side-effects enabled flag (seen) 648 and shift register, sh 647, are initialized based on the novl term (i.e., based on the number of overlapped logical iterations (NOVL) minus one).

In addition to the register write to LR, initialization code 410 includes a Control Transfer OP (CTOP) encoding control transfer 471. In an embodiment in accordance with the CTOP definitions of TABLE 1, initialization code 410 includes CTOP=6, encoding a control transfer to the loop body address encoded in Control Transfer Preparation Register (CTPR3a) 850. Deferred control transfer flags dct0 714, dct1 715, and dct2 716 are necessarily unset in accordance with the above register write operation to LR. The higher priority conditions evaluate to false and control transfers associated with the deferred control transfer flags are not taken.

Inner loop body code 430 includes a decrement loop register (DLR) operation, which like the register write to loop register (LR) operation described above operates on a variety of underlying fields of loop parameters register (LPR) 710, loop state register 1 (LSR1) 720, and shift register, sh 647. In addition, the decrement loop register (DLR) operation updates a base register (BR) for addressing into predicate file 231. The decrement loop register (DLR) operation performs the following actions:

```
if (LPR.dlc && !(ls_eplg || ls_ldovl_limit))
    LSR1.clc = LSR1.clc - 1 ;
if (ls_lst_itr_bgn && !ls_ldovl_limit)
    LSR1.ecnt = LPR.novl ;
if (ls_eplg && !((LSR1.ecnt == 0) || ls_ldovl limit))
    LSR1.ecnt = LSR1.ecnt - 1 ;
if (ls_stat_enbl)
    begin
        next_LSR2.sh = LSR2.sh >> 1 ;
        if (LSR2.sh[1])
            LSR1.seen = 1 ;
    end
if (ls_stat_enbl)
    BR.bpcur := (BR.bpcur - 1) mod (BR.bpsz + 1) ~
``` where current loop counter field (clc) 645 is decremented during non-epilogue physical iterations of inner loop body code 430, where epilogue counter field (ecnt) 641 is set to the value stored in novl 711 at the beginning of the last logical iteration and thereafter decremented, and where shift register, sh 647, is right shifted during each physical iteration of inner loop body code 430. As before, the ls_ldovl_limit and ls_stat_enbl predicates are not closely related to the implementation of nested loop control, but rather, relate to an implementation of array prefetch operations. Array prefetch operations are described in greater detail in (a) the co-pending patent application entitled "Array Prefetch Algorithm," Ser. No. 08/733,831, naming Babaian et al. as inventors and filed on even date herewith, and (b) the corresponding PCT international application designating the United States of America (serial no. PCT/RU96/00217), the detailed descriptions of which are incorporated herein by reference. Based on the exemplary DLR semantics described above, the decrement loop register (DLR) operation should be encoded in the last long instruction word of inner loop body code 430.

In addition to the decrement loop register (DLR) operation, inner loop body code 430 includes a Control Transfer OP (CTOP) encoding control transfers 474, 475, and 477, i.e., encoding a three-way control transfer. In an embodiment in accordance with the CTOP definitions of TABLE 1, inner loop body code 430 includes CTOP=2, encoding control transfers to the top of inner loop body code 430 (via the address stored in CTPR3a), to start patch 420 (via the address stored in CTPR2a), and to finish patch 440 (fall through, "CTPR0a"). Variations for simple loop body code, for inner loop body code, and for nested loop body code with a middle patch for use when an array prefetch algorithm is employed are all straightforward. For simple loop body code (i.e., single level, unnested loop body code) or inner loop code without overlapped outer loop iterations, a CTOP=1 (rather than CTOP=2) encodes a two-way control transfer either to the top of the loop body code (via the address stored in CTPR3a) or to subsequent code (fall through, CTPR0a). For nested loop body code with a middle patch (not shown), a CTOP=3 (rather than CTOP=2) encodes a four-way control transfer to the top of inner loop body code 430 (via the address stored in CTPR3a), to start patch 420 (via the address stored in CTPR2a), to the middle patch (via the address stored in CTPR1a) and to finish patch 440 (fall through, CTPR0a).

Finish patch 440 includes a Control Transfer OP (CTOP) encoding control transfers 473, 476, and 478, i.e., encoding a three-way control transfer. In an embodiment in accordance with the CTOP definitions of TABLE 1, inner loop body code 430 includes CTOP=7, encoding control transfers to the top of inner loop body code 430 (via the address stored in CTPR3a), to start patch 420 (via the address stored in CTPR2a), and to subsequent code (fall through, "CTPR0a").

In the exemplary embodiment of multi-way control transfer logic 800 described herein, Control Transfer OPs (CTOPs) are implemented as two-step, delayed branches. Control transfer conditions calculation and encoding of a CTPR number, is included in the first step, which in the exemplary VLIW processor 200 embodiment described herein is encoded in a first long instruction. The actual control transfer switch (CTS) is then performed in the next long instruction, i.e., in a delay slot. As a result, each of the above Control Transfer OPs (CTOPs) are encoded in a second-to-last long instruction word of a respective portion of nested loop code 400, i.e., in the second-to-last long instruction words of initialization code 410, of start patch 420, of inner loop body code 430, or of finish patch 440. However, alternative embodiments which implement in Control Transfer OPs (CTOPs) in a single step are also suitable and, in such embodiments, CTOPs are encoded in the last long instruction of respective portions of nested loop code 400.

In addition to the loop state modifications explicitly encoded in operations of initialization code 410, start patch 420, inner loop body code 430, and finish patch 440, modifications to certain fields of loop state register 1 (LSR1) 720 are implicit in the control transfer switch (CTS) step of Control Transfer OP (CTOP) evaluation, i.e., certain loop state modifications are automatically triggered by an actual control transfer. For example, and loop mode flag (lm) 644 and side-effects enabled flag (seen) 648 are modified as described below. On inner loop body code 430 entry, i.e., on a control transfer taken via CTPR3a, loop mode flag (lm) 644 is set:

if (CTER.LCT && (CTER.CTPR#==3)) LSR1.lm=1;
Correspondingly, inner loop body code 430 exit clears the loop mode:
if (CTER.LCT && (CTER.CTPR#!=3)) LSR1.lm=0;
where the set of control transfers taken via a control transfer preparation register number (CTPR#) other than via CTPR3a includes control transfers exiting inner loop body code 430 (e.g., control transfer 477 via "CTPR0a" and control transfer 475 via CTPR2a).

At the end of the last iteration of inner loop body code 430 within the last outer loop iteration, side-effects enabled flag (seen) 648 is cleared as follows:
if (CTER.LCT && LSR1.dct0) LSR1.seen=0;
where deferred control transfer flag dct0 714 is set:
LSR1.dct0=ls_lst_itr_end||ls_break;
during the control transfer condition (CTC) step of effective Control Transfer OPs (CTOPs) CTOP=1, CTOP=2, or CTOP=3. Explicit encodings (in operations of initialization code 410, start patch 420, inner loop body code 430, and finish patch 440) of conditional modifications to loop mode flag (lm) 644 and side-effects enabled flag (seen) 648 are also suitable, though less efficient of long instruction word space and execution time.

Very Long Instruction Word (VLIW) Processor

Referring back to FIG. 2, a Very Long Instruction Word (VLIW) processor 200 embodiment of the present invention includes a long instruction word architecture and exploits Instruction Level Parallelism (ILP) among operations of a long instruction word. A compiler is used to schedule operations to be executed by VLIW processor 200 during each cycle. The design of VLIW processor 200 allows concurrent execution of multiple independent operations (e.g., load, store, add, multiply, divide, shift, logical, and branch operations) that make up a long instruction. Long instructions are stored in a memory 211 and an instruction cache (IC) 282 of VLIW processor 200 in packed form as sets of 16- and 32-bit syllables. Particular operations can occupy a part of syllable, a whole syllable or several syllables. Operation execution time at execution units 248 is one cycle for integer and logic operations, two cycles for floating point addition, three or four cycles for floating point multiplication, seven cycles for word format division, and ten to eleven cycles for two-word format, normalized operands. All operations except division can be executed in every cycle; division can be run every other cycle.

VLIW processor 200 includes an instruction buffer (IB) 210, a control unit (CU) 220, a multiport register file (RF) 230, 4 arithmetic logic channels (ALC0 241, ALC1 242, ALC2 243, and ALC3 244), each of which includes multiple execution units 248, array access channels (AAC0, AAC1, AAC2, and AAC3) 250, a memory management unit (MMU) 260, a memory access unit (MAU) 270, an array prefetch buffer (APB) 235, and a data cache (DCACHB) 280. The combination of long instructions encoding multiple independent operations and the large number of execution units 150 allows several alternative program branches to execute concurrently in a speculative mode.

Instruction buffer 210 fetches long instructions from memory 211, or from an included instruction cache (IC) 282 if cached. In an exemplary embodiment of VLIW processor 200, instruction buffer 210 includes instruction cache (IC) 282, instruction alignment logic, a program counter register (PC) 216, and control transfer preparation registers (CTPR1 213, CTPR2 214, and CTPR3 215). Instruction cache (IC) 282 is filled in response to both linear program path prefetches and control transfer preparation operations.

Control unit (CU) 220 issues operations from a long instruction to execution units (EUs) 248. In addition, control unit (CU) 220:

1. reads up to ten operands from the register file (RF) 230 for provision to arithmetic logic channels (ALC0 241, ALC1 242, ALC2 243, and ALC3 244);

2. reads up to three predicate values from predicate file (PF) 231 as condition codes for Control Transfer OPerations (CTOPs);

3. reads up to eight predicate values from the predicate file (PF) 231 for provision to the calculate condition unit (CCU) 233 for calculation of new predicate values and generation of a condition execution mask for operations at execution units 248 of arithmetic logic channels (ALC0 241, ALC1 242, ALC2 243, and ALC3 244) and for operations in array access channels (AAC0, AAC1, AAC2, and AAC3) 250;

4. issues literal values to arithmetic logic channels (ALC0 241, ALC1 242, ALC2 243, and ALC3 244) and array access channels (AAC0, AAC1, AAC2, and AAC3) 250;

5. issues up to four operations to arithmetic logic channels (ALC0 241, ALC1 242, ALC2 243, and ALC3 244);

6. issues up to four operations to array access channels (AAC0, AAC1, AAC2, and AAC3) 250; and 7. issues up to four operations to calculate condition unit (CCU) 233.

Control unit (CU) 120 also executes Control Transfer OPerations (CTOPs) and includes an instruction register (IR) 221, an unpacked instruction register, scattering logic, and special registers 224. The special registers 224 include:

1. loop parameter and status registers 640 (e.g., LPR, LSHR1, LSHR2, and LSHR3) used for loop control and 2. base registers for addressing into predicate file 231 for control transfers and conditional (predicated execution) mode. Both the loop parameter and status registers and the base registers are software accessible for read and write. The design and operation of instruction register 221, the unpacked instruction register, and scattering logic are described in greater detail in (a) a co-pending patent application entitled "Wide Instruction Unpack," Ser. No. 08/733,832, naming Sakhin et al. as inventors and filed on even date herewith, and (b) the corresponding PCT international application designating the United States of America (serial no. PCT/RU96/00218), the detailed descriptions of which are incorporated herein by reference.

Predicate file (PF) 231 includes storage for predicate values generated by integer and floating point compare operations. Predicate values are used to control the conditional (or predicated) execution of operations. In the exemplary embodiment of FIG. 2, predicate file (PF) 231 includes 32 two-bit registers. Calculate condition unit (CCU) 233 generates a mask for conditional execution of operations at execution units 248 of arithmetic logic channels (ALC0 241, ALC1 242, ALC2 243, and ALC3 244) and for operations in array access channels (AAC0, AAC1, AAC2, and AAC3) 250.

In the exemplary embodiment of FIG. 2, register file 230 includes 18-port memory that enables each of 4 execution units to read 2 arguments (or 3 arguments in the case of store operations), to write 4 results (one from each ALU) and to write 4 values read from memory in each cycle. Register file 230 includes 256 66-bit registers, that are accessed with 4 bases (CWP, CWPAR, BR1, BR2) defined in special registers 224 of control unit 220. Each base allows the addressing of up to 64 registers from register file 230. Like the Cydra 5, VLIW processor 200 provides register addressing which is relative to a base register. The loop base registers, BR1 and BR2, allow decrementing and cycling to provide a rotating set of physical registers from register file 230 to represent vector elements in software pipelined inner loops. In this way, a compiler can allocate a consecutive set of registers which is only as long as the lifetime of a vector element.

Execution units of VLIW processor 200 are combined in 4 pipelined ALU channels (ALC0 241, ALC1 242, ALC2 243, and ALC3 244). Each ALU channel has 2 data multiplexers MUX0 and MUX1, unpack circuits, and 2 input registers (Data Reg0 and Data Reg1). The design and operation of execution units and ALU channels of VLIW processor 200 are described in greater detail in (a) a co-pending patent application entitled "Multifunctional Execution Unit, Executing Combined Operations and Supporting Continuing Instruction Flow," Ser. No. 08/733,834, naming Gorshtein et al. as inventors and filed on even date herewith, and (b) the corresponding PCT international application designating the United States of America (serial no. PCT/RU96/00214), the detailed descriptions of which are incorporated herein by reference.

In the embodiment of FIG. 2, individual ALU channels differ in the set of execution units implemented and operations supported. For example, ALC0 241 includes execution units for executing integer arithmetic, division, and floating point addition operations. ALC1 242 includes execution units for executing memory access operations, integer operations and floating point addition operations. ALC2 243 includes execution units for executing integer, logic and shift operations, as well as floating point addition and multiplication operations. Finally, ALC3 244 includes execution units for executing integer and logic operations, floating point multiplication operations, and memory access operations.

The assignment of operation sets to ALCs is driven by a desire to provide even ALU channel loading for integer as well as floating-point computations. However, alternate execution unit configurations would also be suitable, including larger or smaller numbers of ALCs, alternate mappings of operations to ALCs, and segregated integer and floating point execution unit configurations. Indeed alternative embodiments need not group execution units in ALCs. Suitable designs for such alternate configurations will be appreciated by those of ordinary skill in the art. Execution unit and ALC configurations are of any such suitable designs.

Besides the memory access execution units of ALC1 and ALC3, memory access is also possible via array access channels (AAC0, AAC1, AAC2, and AAC3) 250. During loop execution, array access units (AAUs) of the array access channels 250 issue addresses for the loading (and storing) of array elements from (and to) main memory to (and from) register file 230. In the exemplary embodiment of FIG. 2, each of 4 independent array access channels 250 (i.e., AAC0–AAC3) corresponds to a DTLB 237 port. Each array access channel includes 8 pairs of address registers, which include a current address register (CAR) and an increment register (INCR). For memory accesses, one pair of address registers is used in every cycle. For operations in a loop (e.g., loads and stores of array elements with a constant step through the array) the current address from the CAR register is delivered to the memory and is modified by an increment from the INCR register. In the exemplary embodiment of FIG. 2, AAC0 and AAC2 are used for load memory accesses, and AAC1 and AAC3 are used for both load and store memory accesses.

Array prefetch buffer (APB) 235 is used to prefetch array elements for loops from memory. In the exemplary embodiment of FIG. 2, array prefetch buffer (APB) 235 includes a four-channel FIFO buffer. Each channel includes forty-eight (48) 66-bit registers. Data are transferred from array prefetch buffer (APB) 235 to register file (RF) 230 when the data are ready. Suitable array prefetch buffer designs (such as for array prefetch buffer (APB) 235) and suitable array access unit designs (such as for array access channels (AAC0, AAC1, AAC2, and AAC3) 250) are described in greater detail in (a) a co-pending patent application entitled "Array Prefetch Algorithm," Ser. No. 08/733,831, naming Babaian et al. as inventors and filed on even date herewith, and (b) the corresponding PCT international application designating the United States of America (serial no. PCT/RU96/00217), the detailed descriptions of which are incorporated herein by reference.

Memory management Unit (MMU) 260 includes a four-port Data Translation Lookaside Buffer (DTLB) 237 with 64 entries and hardware for searching in a page table in the case of a DTLB 237 miss. Memory management unit (MMU) 260 also contains disambiguation memory 294 for checking rearrangement correctness of load and store operations, performed by an optimizing compiler.

Memory access unit (MAU) 270 provides an interface for communicating between VLIW processor 200 and memory 211 at an exchange rate of up to four information words transferred per cycle. Memory access unit (MAU) 270 includes an entry buffer for memory requests and a crossbar of five memory access channels (i.e., four data access channels and one instruction access channel for instruction fetches from instruction buffer 210) to four physical memory channels. In the exemplary embodiment of FIG. 2, the two least significant bits of a physical address correspond to physical memory channel number each memory access channel includes a 64-bit data path.

Data cache (DCACHE) 280 caches data for scalar memory accesses and, in the exemplary embodiment of FIG. 2, is organized as a write-through, 32 Kbyte, four-way set associative with 64-byte blocks, although alternative organizations are also suitable.

Additional Embodiments

While the invention has been described with reference to various embodiments, it will be understood that these embodiments are illustrative and that the scope of the invention is not limited to them. Many variations, modifications, additions, and improvements of the embodiments described are possible. For example, the configuration of VLIW processor 200 is merely illustrative of a Very Long Instruction Word (VLIW) embodiment of the present invention. Alternate embodiments of the present invention provide loop control for a pipelined processor having single operation instructions, for a pipelined processor having an N-wide instruction pipeline, and for a pipelined execution unit of a multi-execution processor. Suitable modifications for each will be appreciated by persons of ordinary skill in the art.

Loop control logic 600 is similarly illustrative. Alternative embodiments may incorporate other structures and/or methods for distinguishing the prologue and epilogue portions of a loop body. Alternative embodiments may also incorporate other structures and/or methods and for inhibiting the operation of side-effects operations during the prologue and of load operations during the epilogue. Furthermore, alternative processor embodiments may define analogous sets of operation classes in accordance with the operation semantics implemented by a particular processor architecture without departing from the spirit and scope of the invention.

Multi-way control transfer logic 800 is similarly illustrative. Alternative embodiments may incorporate other structures and/or methods for distinguishing the beginning and end of a last logical iteration of an inner loop body. Alternative embodiments may also incorporate other structures and/or methods for selecting a control transfer address from a plurality of branch addresses based on loop status dependent predicates. Alternative embodiments may implement multi-way control transfers in fewer or greater steps and multi-way control transfer logic and registers may support larger or smaller numbers of control transfer targets. Furthermore, alternative processor embodiments may define analogous sets of loop state predicates selective for control transfer targets and analogous portions or patches in accordance with the nested loop code 400 structures of the particular processor architecture without departing from the spirit and scope of the invention.

The particular organization of loop parameter and status registers 640 is merely illustrative and wide variety of suitable alternate groupings, field widths, state mappings, state transition pathways, etc. will be appreciated by persons of ordinary skill in the art. Similarly, the particular organization of control transfer registers (including CTPRia/CTPRic pairings and the CTPR/CTER distinction) is merely illustrative and wide variety of suitable alternate groupings, field widths, CTOP mappings, etc. will be appreciated by persons of ordinary skill in the art.

Additionally, structures and functionality presented as hardware in the exemplary embodiment may be implemented as software, firmware, or microcode in alternative embodiments. These and other variations, modifications, additions, and improvements may fall within the scope of the invention as defined in the claims which follow.

What is claimed is:

1. An apparatus comprising:
   a first register complex responsive to physical iterations of inner loop body code, wherein a state of the first register complex advances toward a beginning of last iteration state in correspondence with the physical iterations of the inner loop body code;
   a second register complex responsive to physical iterations of inner loop body code, wherein a state of the second register complex advances toward an end of last iteration state in correspondence with the physical iterations of the inner loop body code; and
   multiway control transfer logic coupled to the first and second register complexes, the multiway control transfer logic selective for one of a plurality of control transfer addresses, wherein the multiway control transfer logic selects a first control transfer address in response to an asserted beginning of last iteration state and selects a second control transfer address in response to an asserted end of last iteration state.

2. An apparatus as recited in claim 1, wherein the multiway control transfer logic further selects a third control transfer address in response to unasserted beginning of last iteration and end of last iteration states.

3. An apparatus as recited in claim 2, wherein, for a control transfer from the inner loop body code,
   the first control transfer address is that of a start patch;
   the second control transfer address is that of a finish patch; and
   the third control transfer address is that of the inner loop body code.

4. An apparatus, as recited in claim 3, wherein the inner loop body code comprises software pipelined operations corresponding to an innermost loop nested within an outer loop.

5. An apparatus as recited in claim 1, further comprising:
   a plurality of control transfer address registers;
   a program counter register; and
   a branch target selector coupled to an instruction decoder to receive information from a control transfer operation, the branch target selector further coupled to the first and second register complexes to receive assertions of the beginning of last iteration state and the end of last iteration state, the branch target selector further coupled to select a next program counter value from a set of inputs comprising the program counter register and the plurality of control transfer address registers, wherein the branch target selector selects the next program counter value in accordance with predefined combinations conditions established by of a control transfer operation and in accordance with the beginning and end of last iteration states.

6. An apparatus as recited in claim 5, wherein the control transfer operation establishes a plurality, N, of prioritized control transfer conditions each selective for a control transfer via an Nth corresponding one of the control transfer address registers.

7. An apparatus as recited in claim 6, wherein the control transfer operation further establishes an (N+1)th control transfer condition selective for a fall through to a next successive address after that stored in the program counter.

8. An apparatus as recited in claim 7, wherein the control transfer operation corresponds to a first, a second, and a third control transfer condition respectively selective for control transfers from the inner loop body code to a finish patch, to a start patch, and back to the inner loop body code.

9. An apparatus as recited in claim 7, wherein the control transfer operation corresponds to a first, a second, and a third control transfer condition respectively selective for control transfers from a finish patch to subsequent code, to a start patch, and to the inner loop body code.

10. An apparatus, as recited in claim 1, wherein the second register complex comprises:
    an N-bit shift register wherein an indication at a first particular one of the N bits corresponds to the end of last iteration state for a respective one of a plurality of overlapped inner loops and wherein the state of the N-bit shift register is advanced by shifting.

11. An apparatus, as recited in claim 10,
    wherein the second register complex further includes a side-effects enabled flag coupled to the N-bit shift register, wherein the side-effects enabled flag comprises a sticky-bit representation of the first particular one of the N bits of the shift register; and
    wherein the multiway control transfer logic is responsive to a second and successive assertions of the end of last iteration state as indicated by a conjunction of the first particular one of the N bits of the shift register and the side-effects enabled flag.

12. An apparatus, as recited in claim 10, wherein the first register complex comprises:
    a current loop counter field wherein a count value thereof corresponds to the beginning of last iteration state, and wherein the state of the current loop counter field is advanced by counting in accordance with a preselected count direction.

13. An apparatus, as recited in claim 10, further comprising:
    an inner loop initialization operation in a start patch for execution prior to the inner loop body code, wherein the initialization operation sets an Mth bit of the N-bit shift register, M being equal to a number of overlapped logical iterations minus one (1) in the inner loop body code, and wherein the initialization operation further initializes the current loop counter field with an indication corresponding to a number of logical iterations in the inner loop body code.

14. An apparatus, as recited in claim 1, further comprising:
    a plurality of execution units for executing operations of inner loop body code; and
    a memory coupled to execution units.

15. The apparatus of claim 1 in a loop control unit of a pipelined processor.

16. The apparatus of claim 1 in a loop control unit of a Very Long Instruction Word (VLIW) processor.

17. A method of controlling execution of software pipelined inner loop body code, the method comprising the steps of:
    initializing a first register complex with an indication corresponding to a number of logical iterations in the inner loop body code;
    initialing a second register complex with an indication corresponding to a number of overlapped logical iterations minus one (NOVL−1) in the inner loop body code;
    advancing a state of the first register complex toward a beginning of last iteration state in correspondence with physical iterations of the inner loop body code;
    advancing a state of the second register complex toward an end of last iteration state in correspondence with physical iterations of the inner loop body code;

when the first register complex reaches the beginning of last iteration state, transferring control, during a next physical iteration thereafter, to a start patch; and when the second register complex reaches the end of last iteration state, transferring control, during a next physical iteration thereafter, to a finish patch.

18. The method of claim 17, further comprising the steps of:

after the transferring to start patch step, executing the start patch and thereafter transferring back to the inner loop body code; and after the transferring to finish patch step, executing the finish patch and thereafter transferring to one of subsequent non-loop code and the inner loop body code.

19. The method of claim 17, wherein the second register complex state advancing step includes:

shifting an N-bit shift register;

setting a sticky-bit side-effects enabled flag in correspondence with shifting an indication into a particular one of the N bits of the shift register corresponding to the end of last iteration state; and asserting the end of last iteration state in accordance with a conjunction of the particular one of the N bits of the shift register and the sticky-bit side-effects enabled flag.

20. The method of claim 17, wherein the first register complex state advancing step includes:

advancing a counter in accordance with a preselected count direction; and asserting the beginning of last iteration state in accordance a value of the counter corresponding to the beginning of last iteration state.

21. The method of claim 17, further comprising the steps of:

executing a first control transfer operation as a substantially final operation of the inner loop body code;

when the end of last iteration state is asserted, transferring control to a finish patch in response to the first control transfer operation;

when the beginning of last iteration state is asserted, transferring control to a start patch in response to the first control transfer operation; and otherwise transferring control back to the inner loop body code in response to the first control transfer operation.

22. A method for providing a computer system apparatus, the method comprising the steps of:

providing a first register complex responsive to physical iterations of inner loop body code, wherein the state of the first register complex advances toward a beginning of last iteration state in correspondence with the physical iterations of the inner loop body code;

providing a second register complex responsive to physical iterations of inner loop body code, wherein the state of the second register complex advances toward an end of last iteration state in correspondence with the physical iterations of the inner loop body code; and providing multiway control transfer logic coupled to the first and second register complexes, the multiway control transfer logic selective for one of a plurality of control transfer addresses, wherein the multiway control transfer logic selects a first control transfer address in response to an asserted beginning of last iteration state and selects a second control transfer address in response to an asserted end of last iteration state.

23. A method as recited in claim 22, further comprising the steps of:

providing a plurality of execution units for executing operations of inner loop body code; and providing a memory coupled to execution units.

24. A method as recited in claim 23, further comprising the steps of:

providing nested loop code including the inner loop body code, a start patch, and a finish patch, the inner loop body code, the start patch, and the finish patch each including operations executable by the execution units; and providing initialization code including operations for initializing respective control transfer address registers to addresses of the inner loop body code, the start patch, and the finish patch.

* * * * *